United States Patent
Fu et al.

(10) Patent No.: US 10,466,999 B2
(45) Date of Patent: Nov. 5, 2019

(54) SOFTWARE HOT UPGRADING METHOD AND DEVICE

(71) Applicant: Alibaba Group Holding Limited, Grand Cayman (KY)

(72) Inventors: Junkang Fu, Hangzhou (CN); Xiantao Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 94 days.

(21) Appl. No.: 15/805,940

(22) Filed: Nov. 7, 2017

(65) Prior Publication Data

US 2018/0074842 A1 Mar. 15, 2018

Related U.S. Application Data

(63) Continuation of application No. PCT/CN2016/079159, filed on Apr. 13, 2016.

(30) Foreign Application Priority Data

May 7, 2015 (CN) .......................... 2015 1 0231006

(51) Int. Cl.
*G06F 8/656* (2018.01)
*G06F 9/455* (2018.01)
(Continued)

(52) U.S. Cl.
CPC ................ *G06F 8/656* (2018.02); *G06F 8/65* (2013.01); *G06F 9/455* (2013.01);
(Continued)

(58) Field of Classification Search
None
See application file for complete search history.

(56) References Cited

U.S. PATENT DOCUMENTS

2011/0113136 A1 5/2011 Phaal
2014/0053144 A1* 2/2014 Jose .......................... G06F 8/65
717/168

FOREIGN PATENT DOCUMENTS

CN 101329633 12/2008
CN 100568216 C 12/2009
(Continued)

OTHER PUBLICATIONS

CN103473101, Machine Translation. (Year: 2013).*
(Continued)

*Primary Examiner* — Qing Yuan Wu
(74) *Attorney, Agent, or Firm* — Lee & Hayes, P.C.

(57) ABSTRACT

After installation of new version of application such as a program that manages virtualization host is completed; virtual machine status information of a currently running first process of the application is imported to a second process of the application. The second process is initialized to establish a connection between the second process and a process of a machine emulator such as QEMU and the first process exits. Compared with the conventional techniques, since installation of the new version of the application has been completed after the new second process is initialized, the second process already runs based on the new version of software codes. Meanwhile, the virtual machine status information of the second process has been updated to conform to the first process before initiation, so that application-related functions are realized through the correct second process and thus interruption of the application-related functions is avoided during an upgrading process.

20 Claims, 12 Drawing Sheets

(51) Int. Cl.
*G06F 8/65* (2018.01)
*G06F 9/54* (2006.01)
*G06F 8/71* (2018.01)

(52) U.S. Cl.
CPC .......... *G06F 9/45558* (2013.01); *G06F 9/542* (2013.01); *G06F 8/71* (2013.01); *G06F 2009/45562* (2013.01)

(56) References Cited

FOREIGN PATENT DOCUMENTS

| CN | 103136030 | 6/2013 |
| CN | 103473101 | 12/2013 |

OTHER PUBLICATIONS

Translation of International Search Report from corresponding PCT application No. PCT/CN2016/079159 dated Jul. 19, 2016, 2 pages.
Translation of Written Opinion from corresponding PCT application No. PCT/CN2016/079159 dated Jul. 19, 2016, 6 pages.
Translation of Chinese Office Action dated Nov. 2, 2018, from corresponding Chinese Patent Application No. 2015102310064, 36 page.
Translation of Chinese Search Report dated Oct. 10, 2018, from corresponding Chinese Patent Application No. 2015102310064, 1 page.

* cited by examiner

SOFTWARE HOT UPGRADING METHOD AND DEVICE

CROSS REFERENCE TO RELATED PATENT APPLICATIONS

This application claims priority to and is a continuation of PCT Patent Application No. PCT/CN2016/079159, filed on 13 Apr. 2016, which claims priority to Chinese Patent Application No. 201510231006.4, filed on May 7, 2015, entitled "Libvirt Software Hot Upgrading Method and Device," which are hereby incorporated by reference in their entirety.

TECHNICAL FIELD

The present disclosure relates to the technology field of communications and computers and, more particularly, to a method and device for hot updating libvirt software.

BACKGROUND

With the development of Internet technology, virtualization technology has been widely used. Libvirt software is virtualization software that is widely used to manage virtual machine and virtualization function, such as a creation/closure of a virtual machine, a hot migration of the virtual machine, a hot plugging of the virtual central processing unit (VCPU), and a hot plugging of the disk. Libvirt includes a safeguarding process libvirtd. In the virtualization environment of the kernel-based virtual machine (KVM), the relevant functions of libvirt need to be implemented via the libvirtd process. Thus, in the process of using libvirt software, the libvirtd process needs to keep running status.

When updating the libvirt software version, as the originally running libvirtd process is based on the software codes of the old version, after the new version of software is installed, the libvirtd process cannot directly call the software codes of the new version in running status. The conventional method is to restart the libvirtd process after the new version of software is installed so that the libvirtd process runs based on the software codes of the new version to implement the updates of the libvirt software. However, the conventional method will cause the libvirtd process to stop running for a period of time which causes the relevant functions of the libvirt software to be unavailable within such time period, such that the virtual machine cannot be created.

Thus, the conventional updating method of the libvirt software will cause the relevant functions of the libvirt software to be interrupted within certain time period.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method comprising:
completing installing a new version of an application;
importing virtual machine status information of a currently running first process of the application into a second process of the application, the first process of the application running based on a previous version of the application and the second process of the application running based on the new version of the application;
starting the second process of the application;
establishing a connection between the second process of the application and a process of a machine emulator; and
exiting the first process of the software.

For example, the application is a program, such as libvirt software, that manages a virtualization host, which is a virtualization function and virtual machine management software; the machine emulator such as QEMU emulates a device or machine; and the process including the first process and the second process are safeguard process to maintain integrity and completeness of the virtual machine status information, such as a libvirtd process for libvirt software. In the KVM (Kernel-based Virtual Machine) virtualization, the machine emulator (such as QEMU) is a process that is running on the host (such as Linux), and is equivalent to a container of the virtual machine. A host may run on one or more processes of the machine emulator (such as QEMU processes). Each virtual central processing unit (VCPU) of the virtual machine corresponds to a thread of the process of the machine emulator. The process of the machine emulator applies to the host for the memory used by the virtual machine. Meanwhile, the process of the machine emulator is also responsible for emulation of the devices of the virtual machine (such as network cards, mouse, disks, etc.), so that the machine emulator is a very important component of the KVM virtualization.

For example, the virtual machine-related information includes: the virtual machine status information, the virtual machine memory address information, and the virtual machine video memory address information.

The method may further comprise:
prior to the importing the virtual machine status information of the currently running first process of the application into the second process of the application,
blocking a first event message sent by the process of the machine emulator to a process of the application, the process of the application including the first process of the application or the second process of the application, the first event message including an event message that the process of the machine emulator sends to the process of the application when a virtual machine status changes; and
after the exiting the first process of the application,
cancelling the blocking of the first event message.

For example, the blocking the first event message sent by the process of the machine emulator to the process of the application includes:
instructing the first process of the application to send a first command to the process of the machine emulator so that the process of the machine emulator pauses to send the first event message to the process of the application according to the first command.

For example, wherein the cancelling the blocking of the first event message includes: instructing the second process of the application to send a second command to the process of the machine emulator so that the machine emulator resumes to send the first event message to the process of the application according to the second command.

For example, the starting the second process of the application includes:

creating a connection path corresponding to the second process of the application to establish a connection between a client terminal and the second process of the application. The method may further comprise:

prior to the existing the first process of the application and after the starting the second process of the application, selecting the connection path corresponding to the second process of the application according to a creation time of the connection path to establish the connection between the client terminal and the second process of the application.

For example, the method further comprises:

prior to the starting the second process of the application, obtaining virtual machine status information of a new virtual machine that is newly created by the first process of the application within a first time period, the first time period being a time period between a time that virtual machine status information of the first process of the application has been imported into the second process of the application and a time of starting the second process of the application; and adding the virtual machine status information of the new virtual machine into virtual machine status information of the second process of the application.

For example, the obtaining the virtual machine status information of the new virtual machine that is newly created by the first process of the application within the first time period and adding the virtual machine status information of the new virtual machine into virtual machine status information of the second process of the application includes.

prior to importing the virtual machine status information of the first process of the application into the second process of the application, starting a monitor program to establishing a connection with the first process of the application;

instructing the monitor program to obtain a second event message sent by the first process of the application in the first time period, the second event message being directed to the virtual machine status information of the new virtual machine;

instructing the monitor program to establish a connection with the second process of the application and add the virtual machine status information of the new virtual machine into the second process of the application according to the second event message.

For example, the instructing the monitor program to establish the connection with the second process of the application and add the virtual machine status information of the new virtual machine into the second process of the application according to the second event message includes:

instructing the monitor program to establish the connection with the second libvirtd process;

instructing the monitor program to copy a status file that stores the virtual machine status information of the new virtual machine into a virtual machine status file folder corresponding to the second process of the application; and instructing the monitor program to call an importing interface of the second process of the application through the connection to import the virtual machine status information of the new virtual machine from the status file into the second process according to the second event message.

For example, the method may further comprise:

exiting the monitor program after the starting the second process of the application.

For example, the connection between the monitor program and the first process of the application is a read-only connection.

For example, the exiting the monitor program includes;

checking a connection in relation to the first process of the application, wherein the first process acts as a server terminal; and exiting the monitor program in response to determining that there exists only one client terminal that establishes the connection with the first process of the application and the connection is the read-only connection.

For example, the exiting the first process of the application includes:

checking a connection in relation to the first process of the application, wherein the first process acts as a server terminal; and exiting the first process of the application in response to determining that there exists no client terminal that establishes the connection with the first process of the application.

For example, the exiting the first process of the application in response to determining that there exists no client terminal that establishes the connection with the first process of the application includes:

after the first process of the application checks the connection to which the first process acts as the server terminal, in response to determining that there exists the connection between the client terminal and the first libvirtd process and a preset condition is satisfied, instructing the first process of the application to re-check the connection to which the first process of the application acts as the server terminal until there exists no connection between the client terminal and the first process of the application; and exiting the first process of the application.

For example, the preset condition includes that there is a new client terminal that establishes or disconnects the connection with the first process of the application.

For example, the preset condition includes that a preset time period is passed.

The present disclosure further provides a device comprising:

one or more processors, and one or more memories storing thereon computer-readable instructions that, when executed by the one or more processors, cause the one or more processors to perform acts comprising:

installing a new version of an application;

importing virtual machine status information of a currently running first process of the application into a second process of the application, the first process of the application running based on a previous version of the application and the second process of the application running based on the new version of the application;

starting the second process of the application;

establishing a connection between the second process of the application and a process of a machine emulator; and exiting the first process of the software.

For example, the application is a program that manages a virtualization host; and the machine emulator is a program that emulates a virtual machine.

The present disclosure also provides one or more memories storing thereon computer-readable instructions that, when executed by one or more processors, cause the one or more processors to perform acts comprising:

completing installing a new version of an application;

starting a monitor program to establishing a connection with a first process of the application, the first process of the application running based on a previous version of the application;

instructing the monitor program to obtain a second event message sent by the first process of the application in the first time period, the second event message being directed to virtual machine status information of new virtual machine that is newly created by the first process of the application in the first time period;

instructing the monitor program to establish a connection with a second process of the application and add the virtual machine status information of the new virtual machine into a second process of the application according to the second event message, the second process of the application running based on the new version of the application; and starting the second process of the application.

The above method, device and memory example embodiments may refer to each other. All acts described in the method embodiments are performed by the device and processor in the device and memory embodiments as well, which are not repeated therein for brevity.

BRIEF DESCRIPTION OF THE DRAWINGS

The features, purposes, and advantages of the present disclosure become more apparent in view of the description of the non-restrictive example embodiments as shown in the FIGS.

Figure 1:
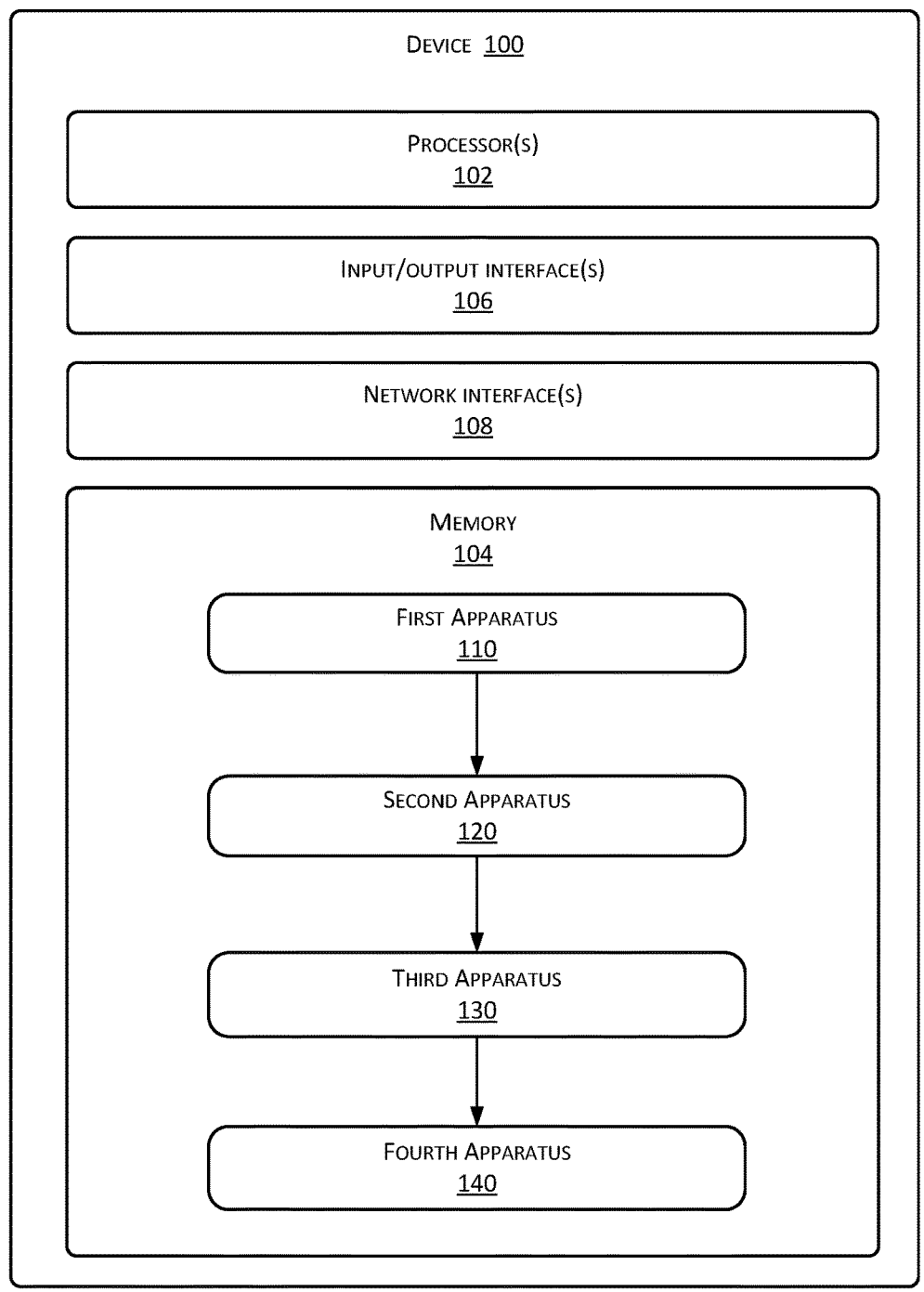
FIG. 1 is a schematic diagram illustrating a device for hot updating libvirt software according to an aspect of the present disclosure.

The same or similar labels in the FIGs represent same or similar components.

DETAILED DESCRIPTION

In conjunction with the following FIGs of the present disclosure, the technical solutions of the present disclosure will be described. Apparently, the described example embodiments merely represent some of the example embodiments of the present disclosure and are not to be construed as limiting the present disclosure. All other example embodiments obtained by those of ordinary skill in the art based on the example embodiments of the present disclosure fall within the scope of protection of the present disclosure.

In the following example embodiments, for example, the application is a program that manages a virtualization host such as libvirt software; the machine emulator, such as QEMU, is a program that emulates a machine or a device; and the process including the first process and the second process are safeguard process to maintain integrity and completeness of the virtual machine status information, such as a libvirtd process for libvirt software. However, the libvirt software, QEMU, and libvirtd process are just used as illustration and should not be construed as limiting the present disclosure. One of ordinary skill in the art understands that the techniques of the present disclosure are applicable to any method or device for hot upgrading application or software, especially for virtualization and emulation application in the field of virtual machine technology.

In a standard configuration of the present disclosure, the terminal, the device and trusted party in the network include one or more central processing units (CPUs), input/output interface(s), network interface(s), and memory. The memory may include non-permanent memory, random access memory (RAM) and/or nonvolatile memory, such as read-only memory (ROM) or flash memory, in computer-readable media. The memory is an example of computer readable media.

The computer readable media include non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. According to the definition herein, the computer readable media do not include transitory media, such as modulated data signals and carriers.

The present disclosure provides a data and method for hot updating libvirt software to resolve the problem that the relevant functions of libvirt interrupt during the updating process.

The present disclosure provides a method for hot updating libvirt software. The method includes:

completing an installation of a new version of the libvirt software;

importing virtual machine status information of a currently running first libvirtd process into a second libvirtd process, wherein the first libvirtd process is running based on a previous version of libvirt software and the second libvirtd process is running based on the new version of the libvirt software;

starting the second libvirtd process and establishing a connection between the second libvirtd process and a process of a machine emulator such as QEMU; and exiting the first libvirtd process.

Further, prior to importing the virtual machine status information of the currently running first libvirtd process into the second libvirtd process, the method may further include:

blocking (or pending) first event message sent by the QEMU process to the libvirtd process, wherein the first event message includes an event message that the QEMU process sends to the libvirtd process when the virtual machine status changes.

Further, after exiting the first libvirtd process, the method may further include:

cancelling the blocking of the first event message sent by the QEMU process to the libvirtd process.

Further, the blocking the first event message sent by the QEMU process to the currently running first libvirtd process includes:

sending a first command by the currently running first libvirtd process to the QEMU process, wherein the EMU process pauses to send the first event message to the libvirtd process according to the first command.

For example, the cancelling the blocking of the first event message sent by the QEMU process to the currently running first libvirtd process includes:

sending a second command by the currently running second libvirtd process to the QEMU process, wherein the QEMU process resumes to send the first event message to the libvirtd process according to the second command.

Further, the starting the second libvirtd process includes:

When the second libvirtd process is started, the second libvirtd process creates a connection path corresponding to the second libvirtd process. The connection path corresponding to the second libvirtd process is used to establish a connection between the client terminal and the second libvirtd process.

Prior to exiting the first libvirtd process, the method may further include:

The client terminal, after the second libvirtd process is started, selects the connection path corresponding to the second libvirtd process to establish a connection with the second libvirtd process according to a creation time of the connection path of the libvirtd process.

Further, prior to starting the second libvirtd process, the method may further include;

obtaining the newly created virtual machine status information of the new virtual machine created by the first libvirtd process within a first time period and adding the newly created virtual machine state information into the virtual machine status information of the second libvirtd process, wherein the first time period is a time period between a time that the virtual machine status information of the currently running first libvirtd process is imported into the second libvirtd process and a time that the second libvirtd process is started.

Further, the obtaining the newly created virtual machine status information of the new virtual machine created by the first libvirtd process within a first time period and adding the newly created virtual machine state information into the virtual machine status information of the second libvirtd process includes:

Prior to importing the virtual machine status information of the currently running first libvirtd process into the second libvirtd process, starting a monitor program, wherein there is a connection established between the monitor program and the first libvirtd process.

The monitor program obtains the second event message sent by the first libvirtd process in the first time period. The second event message is directed to the newly created virtual machine status information of the new virtual machine that is created by the first libvirtd process.

The monitor program establishes the connection with the second libvirtd process and adds the newly created virtual machine status information into the second libvirtd process according to the second event message.

Further, the monitor program establishes the connection with the second libvirtd process and adds the newly created virtual machine status information into the second libvirtd process according to the second event message, which includes that:

The monitor program establishes the connection with the second libvirtd process:

The monitor program copies the status file that stores the newly created virtual machine status information of the new virtual machine that is created by the first libvirtd process into the virtual machine status file folder corresponding to the second libvirtd process; and The monitor program calls the importing interface of the second libvirtd process through the connection, wherein the importing interface imports the newly created virtual machine status information in the status file into the second libvirtd process.

Further, after the second libvirtd process is started, the monitor program exits.

Further the connection between the monitor program and the first libvirtd process is a read-only connection.

The exit of the monitor program includes:

The first libvirtd process checks the connection to which it acts as the server terminal. In response to determining that there exists only one client terminal that establishes the connection with the first libvirtd process and such connection is read-only connection, the monitor program is instructed to exit.

Further, the exit of the first libvirtd process includes:

The first libvirtd process checks the connection to which it acts as the server terminal. In response to determining that there exists no client terminal that establishes the connection with the first libvirtd process, the first libvirtd process exits.

Further, after the first libvirtd process checks the connection to which it acts as the server terminal, the acts further include:

In response to determining that there exists the connection between the client terminal and the first libvirtd process, the first libvirtd process, after satisfying the preset condition, re-checks the connection to which it acts as the server terminal until it is determined that there exists no connection between the client terminal and the first libvirtd process, and then the first libvirtd process exits.

Further, the preset condition includes:

There is a new client terminal that establishes or disconnects the connection with the first libvirtd process, or A preset time period is passed.

According to an aspect of the present disclosure, the present disclosure also provides a device for hot updating libvirt software. The device includes:

a first apparatus that completes an installation of a new version of the libvirt software;

a second apparatus that imports virtual machine status information of a currently running first libvirtd process into a second libvirtd process, wherein the first libvirtd process is running based on a previous version of libvirt software and the second libvirtd process is running based on the new version of the libvirt software;

a third apparatus that starts the second libvirtd process and establishes a connection between the second libvirtd process and a process of a machine emulator (QEMU); and a fourth apparatus that exits the first libvirtd process.

Further, the device may further include:

a fifth apparatus that:

prior to importing the virtual machine status information of the currently running first libvirtd process into the second libvirtd process, blocks first event message sent by the QEMU process to the libvirtd process, wherein the first event message includes an event message that the QEMU process sends to the libvirtd process when the virtual machine status changes, and after exiting the first libvirtd process, cancels the blocking of the first event message sent by the QEMU process to the currently running first libvirtd process.

Further, the fifth apparatus:

prior to importing the virtual machine status information of the currently running first libvirtd process into the second libvirtd process, sends a first command by the currently running first libvirtd process to the QEMU process, wherein the EMU process pauses to send the first event message to the libvirtd process according to the first command; and after exiting the first libvirtd process, sends a second command by the currently running second libvirtd process to the QEMU process, wherein the QEMU process resumes to send the first event message to the libvirtd process according to the second command.

Further, the third apparatus, when the second libvirtd process is started, creates a connection path corresponding to the second libvirtd process for the second libvirtd process.

The connection path corresponding to the second libvirtd process is used to establish a connection between the client terminal and the second libvirtd process.

The device may further include:

a sixth apparatus that, prior to exiting the first libvirtd process, instructs the client terminal, after the second libvirtd process is started, selects the connection path corresponding to the second libvirtd process to establish a connection with the second libvirtd process according to a creation time of the connection path of the libvirtd process.

The device may further include a seventh apparatus that, prior to starting the second libvirtd process, obtains the newly created virtual machine status information of the new virtual machine created by the first libvirtd process within a first time period and adds the newly created virtual machine state information into the virtual machine status information of the second libvirtd process, wherein the first time period is a time period between a time that the virtual machine status information of the currently running first libvirtd process is imported into the second libvirtd process and a time that the second libvirtd process is started.

Further, the seventh apparatus includes:

a seventy-first module that, prior to importing the virtual machine status information of the currently running first libvirtd process into the second libvirtd process, starts a monitor program, wherein there is a connection established between the monitor program and the first libvirtd process;

a seventy-second module that controls the monitor program to obtain the second event message sent by the first libvirtd process in the first time period. The second event message is directed to the newly created virtual machine status information of the new virtual machine that is created by the first libvirtd process; and a seventy-third module that controls the monitor program to establish the connection with the second libvirtd process and adds the newly created virtual machine status information into the second libvirtd process according to the second event message.

Further, the seventy-third module includes:

a seven hundred thirty-first unit that controls the monitor program to establish the connection with the second libvirtd process;

a seven hundred seventy-second unit that controls the monitor program to copy the status file that stores the newly created virtual machine status information of the new virtual machine that is created by the first libvirtd process into the virtual machine status file folder corresponding to the second libvirtd process; and a seven hundred seventy-third unit that controls the monitor program to call the importing interface of the second libvirtd process through the connection, and controls the importing interface to import the newly created virtual machine status information in the status file into the second libvirtd process.

Further, the device may include an eighth apparatus that, after the second libvirtd process is started, instructs the monitor program to exit.

Further the connection between the monitor program and the first libvirtd process is a read-only connection.

The eighth apparatus, after the second libvirtd process is started, instructs the first libvirtd process to check the connection to which the first libvirtd process acts as the server terminal, and, in response to determining that there exists only one client terminal that establishes the connection with the first libvirtd process and such connection is read-only connection, instructs the monitor program to exit.

Further, the fourth apparatus instructs the first libvirtd process to check the connection to which the first libvirtd process acts as the server terminal, and, in response to determining that there exists no client terminal that establishes the connection with the first libvirtd process, exits the first libvirtd process.

Further, the fourth apparatus, after the first libvirtd process checks the connection to which it acts as the server terminal, in response to determining that there exists the connection between the client terminal and the first libvirtd process, instructs the first libvirtd process, after satisfying the preset condition, to re-check the connection to which the first libvirtd process acts as the server terminal until it is determined that there exists no connection between the client terminal and the first libvirtd process, and then exits the first libvirtd process.

Further, the preset condition includes:

There is a new client terminal that establishes or disconnects the connection with the first libvirtd process; or A preset time period is passed.

Compared with the conventional techniques, the present disclosure applies after the second libvirtd process starts when the new version of libvirt software has finished installation and the second libvirtd process is already running based on the new version of software code. Meanwhile, the virtual machine status information of the second libvirtd process is updated to be the same as the first libvirtd process before starting. Thus, the relevant functions of the libvirt software are correctly implemented through the second libvirtd process, thereby avoiding the interruption of the relevant functions of the libvirt software during the updating process.

In addition, the present disclosure blocks or unblocks the first event message sent from the QEMU process to the libvirtd process at specific time, and monitors, via the monitor program, the creation operation of the new virtual machine created by the first libvirtd process within the first time period, thereby avoiding the error of the virtual machine message information of the second libvirtd process.

FIG. 1 is a schematic diagram illustrating a device 100 for hot updating libvirt software according to an aspect of the present disclosure.

The device 100 includes one or more processor(s) 102 or data processing unit(s) and memory 104. The device 100 may further include one or more input/output interface(s) 106 and one or more network interface(s) 108. The memory 104 is an example of computer readable media.

The memory 104 may store therein a plurality of modules or units including a first apparatus 110, a second apparatus 120, a third apparatus 130, and a fourth apparatus 140. Specifically, the first apparatus 110 completes an installation of a new version of the libvirt software. The second apparatus 120 imports virtual machine status information of a currently running first libvirtd process into a second libvirtd process. The third apparatus 130 starts the second libvirtd process and establishes a connection between the second libvirtd process and a process of a machine emulator (QEMU). The fourth apparatus 140 exits the first libvirtd process. After starting the new second libvirtd process, as the new version of libvirt software has finished installing, the second libvirtd process runs based on the new version of the software code. Meanwhile, the virtual machine status information of the second libvirtd process has been updated to the same as the first libvirtd process before starting. Thus, the relevant functions of the libvirt software are correctly implemented through the second libvirtd process, thereby avoiding the interruption of the relevant functions of the libvirt software during the updating process.

The device 100 includes, but is not limited to, a network device, a touch-sensitive terminal, or a device integrated with the network device or the touch-sensitive device through a network. The network includes, but is not limited to, a network mainframe, a single network server, a set of multiple network servers or a set of computer based on cloud computing, which may be implemented by a user device. The cloud is composed of a large number of mainframes or network servers based on cloud computing. The cloud computing is a type of distributive computing and a virtual super computer composed of a set of computers that are connected. For example, the device 100 is a script program executable on the network device, the touch-sensitive terminal, or the device integrated with the network device or the touch-sensitive device through the network.

Figure 2:
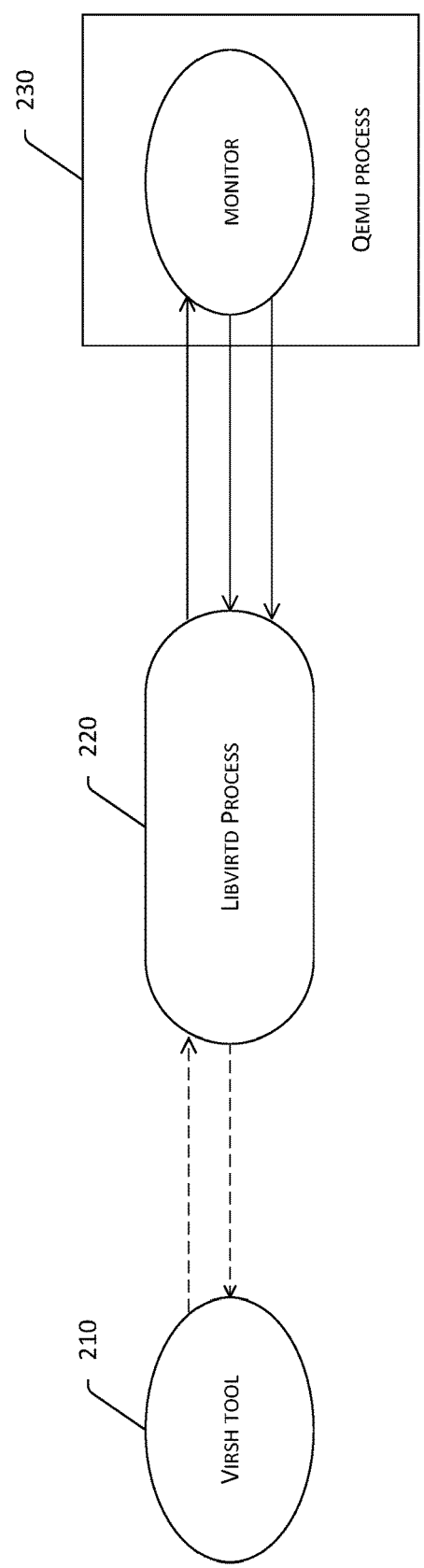
FIG. 2 is a schematic diagram illustrating functions of the libvirt software under the KVM/QEMI virtual environment.

The libvirt software of the present disclosure includes an API database, a safeguard process such as a libvirtd process, and a command line tool such as virsh tool to make virtualization management of the virtual machine monitor (such as Hypervisor). FIG. 2 is a schematic diagram illustrating functions of the libvirt software under the KVM/QEMI virtual environment. In a running process of the libvirt software, the connection between the virsh tool 210 and the libvirtd process is a short connection, which is disconnected after transmitting data once. In such connection, the virsh tool acts as the client terminal and the libvirtd process 220 acts as the server terminal. The connection between the libvirtd process 220 and the QEMU process 230 is a long connection, which keeps connected after the data transmission is completed until a request to disconnect is received. In such connection, the libvirtd process 220 acts as the client terminal and the QEMU process 230 acts as the server terminal.

In the device 100, the first libvirtd process and the second libvirtd process may be obtained by modifying the original libvirtd process. For example, a label parameter is added into the first libvirtd process and the second libvirtd process. Different label parameters may be imported when starting the processes so that two libvirtd process with different labels co-exist and keep different virtual machine status information. For example, 0 and 1 are used as different label parameters. The first libvirtd process and the second libvirtd process are represented by libvirtd-0 and libvirtd-1 respectively. Each of the libvirtd-0 and libvirtd-1 creates a virtual machine status file to store the virtual machine status information (These files are stored in their corresponding virtual machine status file folders. Each virtual machine corresponds to one status file). During the starting of libvirtd-1, the virtual machine status file of the libvirtd-0 is copied to libvirtd-1 to complete importing of the virtual machine status information.

For the example of the KVM/QEMU virtualization plan, each virtual machine corresponds to a QEMU process. When the QEMU process starts, it is equivalent that a new virtual machine is created. In the virtualization environment as shown in FIG. 2, the libvirtd process acts as the server terminal, receives the command from the virsh tool, and returns the result to the virsh tool. Meanwhile, the libvirtd process, according the command from the virsh tool, further constructs the commands sent to the QEMU process, and sends the command of such construction to the QEMU process as the client terminal, such as stopping/reactivating virtual machine etc. The QEMU process, after receiving the relevant command, executes the corresponding operation and returns the result to the libvirtd process. In addition, the QEMU process may via the monitor (QEMU monitor) actively send the event message to the libvirtd process that is connected to the monitor. For example, after the user closes the virtual machines, the QEMU process sends the event message of stopping event to the libvirtd process to update the virtual machine status information of the libvirtd process.

When the QEMU process starts, a configuration parameter is imported via the libvirtd process to provide a monitor. The monitor is the interactive interface between the QEMU process and the libvirtd process. The data transmission between the libvirtd process and the QEMU process is conducted via the monitor. To resolve the problems of the conventional techniques, the present disclosure configures two libvirtd processes independent to each other, i.e., the first libvirtd process and the second libvirtd process, and provides two monitors independent to each other and used to maintain independent communication with the first libvirtd process and the second libvirtd process respectively. In the example embodiment of the present disclosure, the two different label parameters 0 and 1 are imported to configure the two monitors, such as monitor-0 and monitor-1, to establish connection between libvirtd-0 and monitor-0 and another connection between libvirtd-1 and monitor-1 to conduct independent communication.

For example, the virtual machine status information may be stored in the form of file, table, or memory data. For instance, the virtual machine status information in the example embodiment of the present disclosure may be stored in the form of .xml file. The file may be named after the name of the virtual machine. For the example of the virtual machine named VM1, the corresponding virtual machine status file is VM1.xml. Each libvirtd process has a file folder to save its virtual machine status file. Assuming that there are already three virtual machines are running before the update, their corresponding virtual machine status files are VM1.xml, VM2.xml, and VM3.xml respectively. These files record the virtual machine status information of the above three virtual machines. Before the second libvirtd process is started, the above three virtual machine status files are copied to the virtual machine status file folder of the second libvirtd process. One of ordinary skill in the art understands that the above storage form of the virtual machine status information is just illustrative. Any other existing or future forms of saving the virtual machine status information, if applicable to the present disclosure, shall also be included in the present disclosure and be incorporated herein.

In the actual processing, after the second apparatus 120 imports the virtual machine status information of the currently running first libvirtd process into the second libvirtd process, and until the third apparatus 130 starts the second libvirtd process and establishes the connection between the second libvirtd process and the QEMU process, there is a certain period of processing time. During such period of processing time, if the virtual machine is closed, the second libvirtd process cannot obtain the status change information by importing the virtual machine status information of the first libvirtd process. In addition, as the second libvirtd process has not established the connection with the QEMU process, the stop event of closing the virtual machine corresponding to the QEMU process cannot be sent to the second libvirtd process so that the second libvirtd process cannot obtain the virtual machine status information arising from closing the virtual machine. Thus, after the second libvirtd process and the QEMU process establish the connection, there is a virtual status mistake between the virtual machine status information of the second libvirtd process and the actual running process of the virtual machine.

Figure 3:
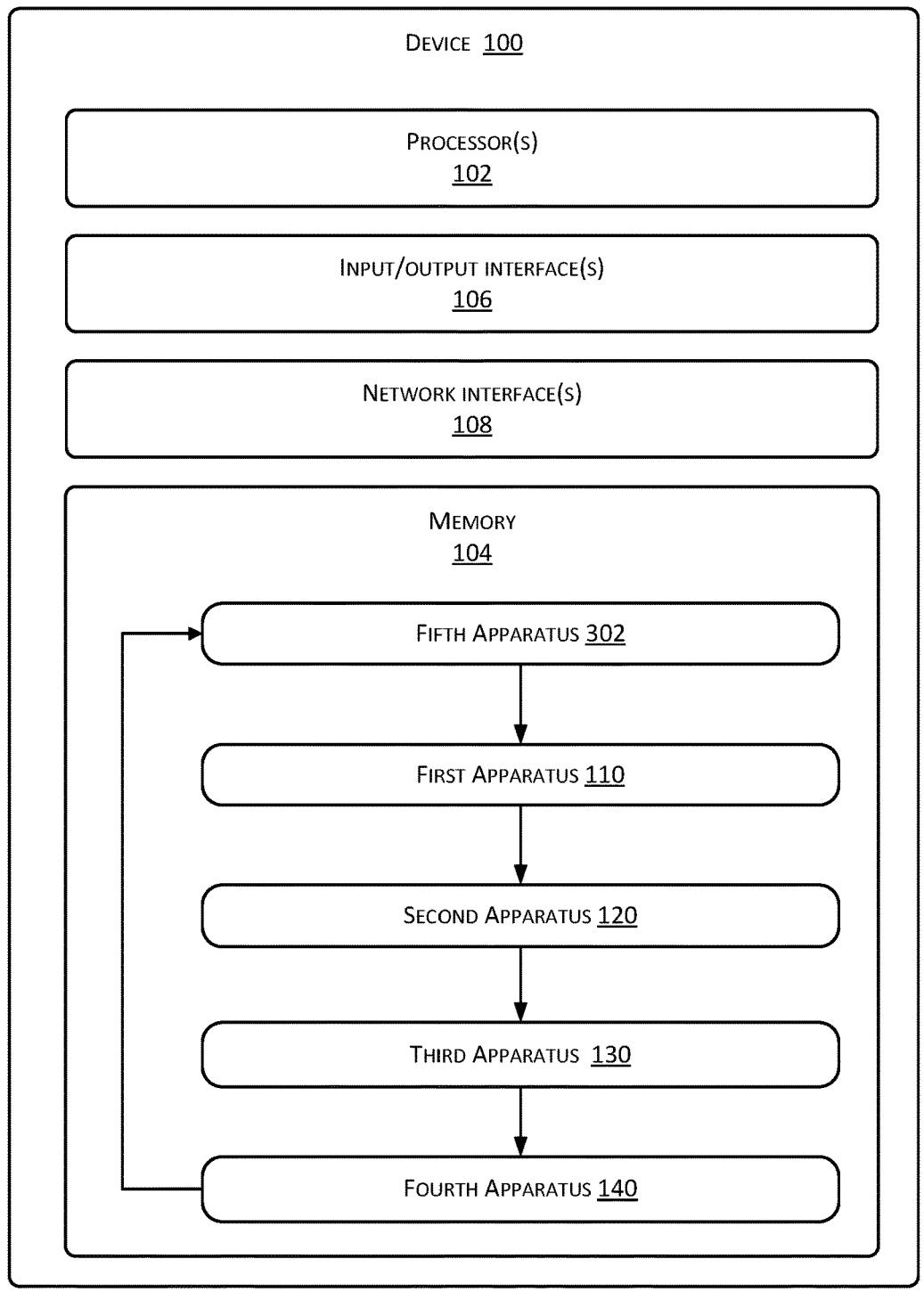
FIG. 3 is a schematic diagram illustrating a device for hot updating libvirt software according to an example embodiment of the present disclosure.

To further resolve the above problem, the present disclosure provides another example embodiment. As shown in FIG. 3, in addition to the apparatuses as shown in FIG. 1, the device 100 may further include a fifth apparatus 302. Before the first apparatus 110 imports the virtual machine status information of the currently running first libvirtd process into the second libvirtd process, the fifth apparatus 302 blocks the first event message sent by the QEMU process to the libvirtd process. After the fourth apparatus 140 exits the first libvirtd process, the fifth apparatus 302 cancels the blocking of the first event message sent by the QEMU process to the currently running first libvirtd process. One of ordinary skill in the art understands that the first apparatus 110, the second apparatus 120, the third apparatus 130, and the fourth apparatus 140 are the same or basically the same as the corresponding apparatuses in the example embodiment of FIG. 1. For brevity, they are not detailed herein and are incorporated herein by reference.

The first event message includes an event message that the QEMU process sends to the libvirtd process when the virtual machine status changes to inform the libvirtd process that the virtual machine status changes so that the libvirtd process updates its virtual status information according to the first event message. For the example of KVM/QEMU virtualization plan, QEMU process creates the corresponding first event message when the virtual machine status changes and sends the first event message to the libvirtd process. The first event messages may include: stop event, pause event, resume event, etc. These first event messages are created by stopping virtual machine operation, pausing virtual machine operation, and resuming virtual operation respectively. As there are two monitors configured for the QEMU process, the first event message, after it's created, will be sent via the two monitors to the two libvirtd processes corresponding to the two monitors respectively. When the connection between the libvirtd process and the monitor is normal, the first event message reaches the libvirtd process. In this example, when the first event message is created, if the second libvirtd process has not established the connection with the QEMU process, the first event message cannot be delivered.

After the first event message sent by the QEMU process to the libvirtd process is blocked, the first event message, after it's created, will not be sent to any libvirtd process. Instead, the QEMU process stores the first event message internally. After the first libvirtd process exits, the block of the first event message sent by the QEMU process to the libvirtd process is cancelled. After the block is cancelled, the first event message sent by the QEMU process to the libvirtd process may include:

1. a first event message that is blocked and stored internally in the QEMU process. If prior to the cancellation of the block, there is the first event message that occurs and is blocked. After the cancellation of the block, the first event message is continuously to be sent;

2. a first event message is newly created after the block. As the second libvirtd process has established connection with the QEMU process, the second libvirtd process receives the first event message that is created after the second libvirtd process imports the virtual machine status information of the currently running first libvirtd process into the second libvirtd process until that the third apparatus starts the second libvirtd process, and before that the second libvirtd process and the QEMU process establish the connection. Thus, the virtual machine status information is updated to avoid the mistake of the virtual machine status. The libvirtd process refers to both the first libvirtd process and the second libvirtd process. That is, the first event message sent by the QEMU process to the libvirtd process are sent to the first libvirtd process and the second libvirtd process simultaneously. If the first libvirtd process and the second libvirtd process are in the starting status and establish the connection with the monitor of the QEMU process, the first event message is received. For the same reason, after the block, the first event message is not sent to either the first libvirtd process or the second libvirtd process.

For example, before the fifth apparatus imports the virtual machine status information of the currently running first libvirtd process into the second libvirtd process, instructs the currently running first libvirtd process to send the first command to the QEMU process. The QEMU process pauses to send the first event message to the libvirtd process. After exiting the first libvirtd process, the fifth apparatus instructs the currently running second libvirtd process sends the second command to the QEMU process. The QEMU process resumes to send the first event message to the second libvirtd process according to the second command. Following the preceding example, the first command and the second command may be implemented using the commonly used QEMU monitor command in the KVM/QEMU virtualization plan. QEMU monitor commands used to block and cancel block are added respectively, and, through the QEMU process, are used to block or cancel block respectively after receiving the corresponding QEMU monitor command.

One of ordinary skill in the art understands that the above first command and the second command are just exemplary. Any other existing or future commands that controls the QEMU process to pause or resume to send the first event message to the libvirtd process, if applicable by the present disclosure, are also included in the present disclosure, and incorporated herein by reference.

For example, when the third apparatus starts the second libvirtd process, the second libvirtd process creates a connection path corresponding to the second libvirtd process. The connection path corresponding the second libvirtd process is used to establish the connection between the client terminal and the second libvirtd process. Correspondingly, the device may also include a sixth apparatus (not shown). Before exiting the first libvirtd process, the sixth apparatus instructs the client terminal, after the second libvirtd process is started, selects the connection path corresponding to the second libvirtd process to establish the connection with the second libvirtd process according to the creation time of the connection path of the libvirtd process.

With respect to the connection paths that are created sequentially, the latest created connection path may be selected. Following the above example, the connection path may be the domain socket path of the second libvirtd process as the server terminal. The domain socket path is automatically created when the libvirtd process is started. Following the preceding example of the two libvirtd processes, i.e., libvirtd-0 and libvirtd-1, each of the two libvirtd processes has independent domain socket path. When libvirtd-0 and libvirtd-1 are started, the created domain socket paths are/ var/run/libvirt/libvirt-sock-1 and/valrun/libvirt/libvirt-sock-2. It is assumed that libvirtd-0 is the process that is running before the version update and libvirtd-1 is the newly started libvirtd process, the generation time of the domain socket path as the serve terminal in libvirtd-0 is t1, the generation time of the domain socket path as the serve terminal in libvirtd-1 is t2, and t2 is later than t1. In this example embodiment, as t2 is later than t1, the client terminal will select to establish the connection with libvirtd-1 in priority and then the command sent by the client terminal to the libvirtd process will only be sent to libvirtd-1.

Thus, when two libvirtd processes are running simultaneously, if a device configured with virsh tool (or another management tool program written in c or python language) needs to configure the virtual machine), the configuration command will be sent to the newly started second libvirtd process.

Before the second libvirtd process is started, the client terminal attempting to connect with the libvirtd process will continue to connect with the original first libvirtd process. In the KVM/QEMU virtualization plan in the example embodiment of the present disclosure, the operation that creates the new virtual machine need the device configured with virsh tool to send the command to the libvirtd process and then the libvirtd process configures the QEMU process according to the command. Thus, in a time period after the second apparatus 120 imports the virtual machine status information of the currently running first libvirtd process into the second libvirtd process and before the third apparatus 130 starts the second libvirtd process, the second libvirtd process has not finished starting. If a new virtual machine is created then, the generation is conducted through the original first libvirtd process and the second libvirtd process cannot update the virtual machine status information of the newly created virtual machine, which may cause the omission of the newly created virtual machine status information.

Figure 4:
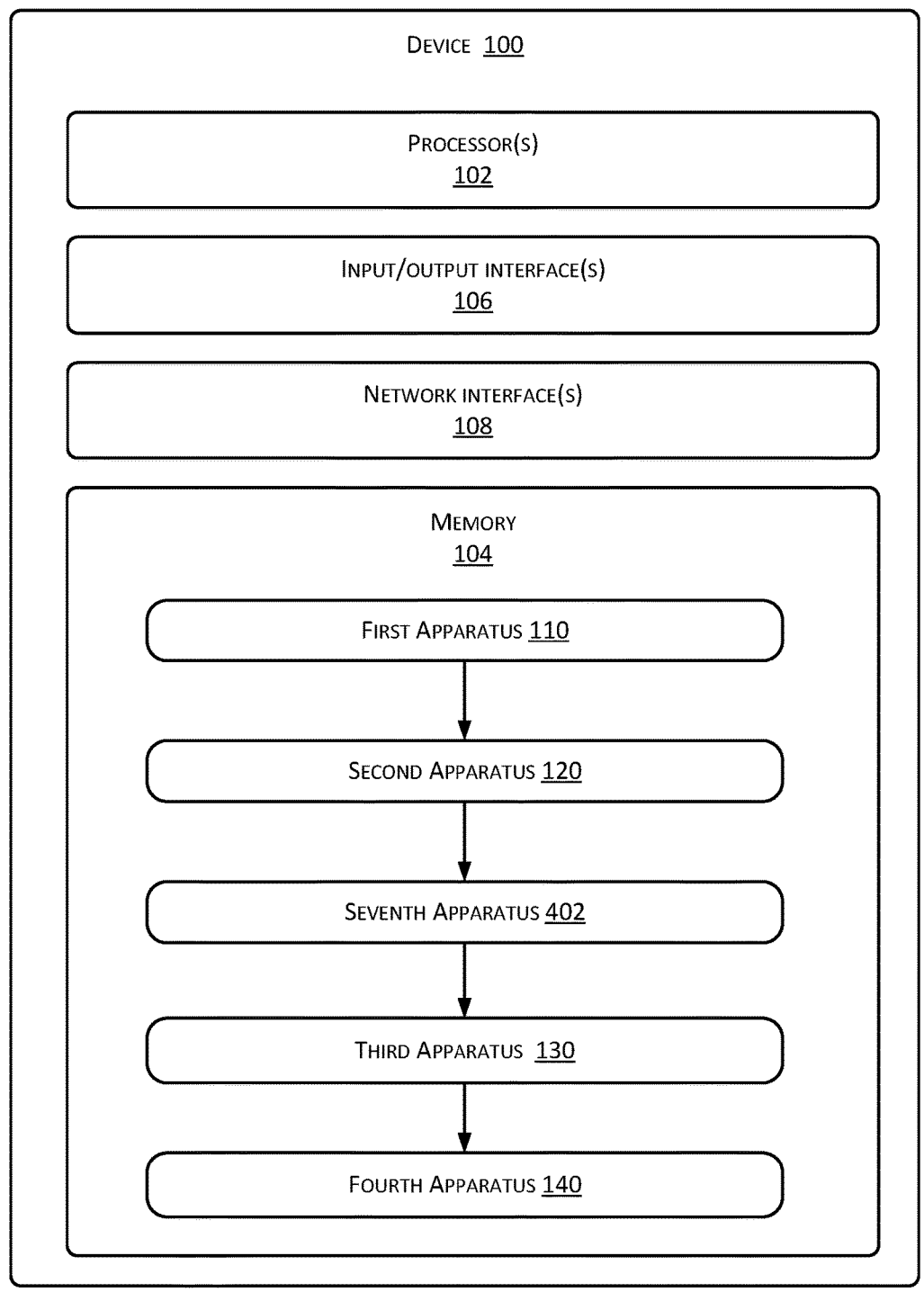
FIG. 4 is a schematic diagram illustrating a device for hot updating libvirt software according to another example embodiment of the present disclosure.

With respect to the above problem, the present disclosure further provides an example embodiment. As shown in FIG. 4, in addition to the apparatuses shown in FIG. 1, the device 100 also includes a seventh apparatus 402 stored in memory 104. For example, the seventh apparatus 402, before starting the second libvirtd process, obtains the newly created virtual machine status information of the new virtual machines that is newly created by the first libvirtd process during the first time period, and adds the newly created virtual machine status information into the virtual machine status information of the second libvirtd process. The first time period is a time period from the time that the virtual machine status information of the currently running first libvirtd process is imported into the second libvirtd process to the time that the second libvirtd process is started. One of ordinary skill in the art understands that the first apparatus 110, the second apparatus 120, the third apparatus 130, and the fourth apparatus 140 are the same or basically the same as the corresponding apparatuses in the example embodiment of FIG. 1. For brevity, they are not detailed herein and are incorporated herein by reference.

The virtual machine status information of the new virtual machine created before the first time period is written into the virtual machine status file of the second libvirtd process through importing. The second libvirtd process creates the new virtual machine after the first time period and thus the second libvirtd process directly obtains the virtual machine status information of the newly created virtual machine. The present disclosure obtains the virtual machine status information of the virtual machine newly created by the first libvirtd process during the first time period, and adds the newly created virtual machine status information into the virtual machine status information of the second libvirtd process, thereby avoiding the omission of the newly created virtual machine status information.

Figure 5:
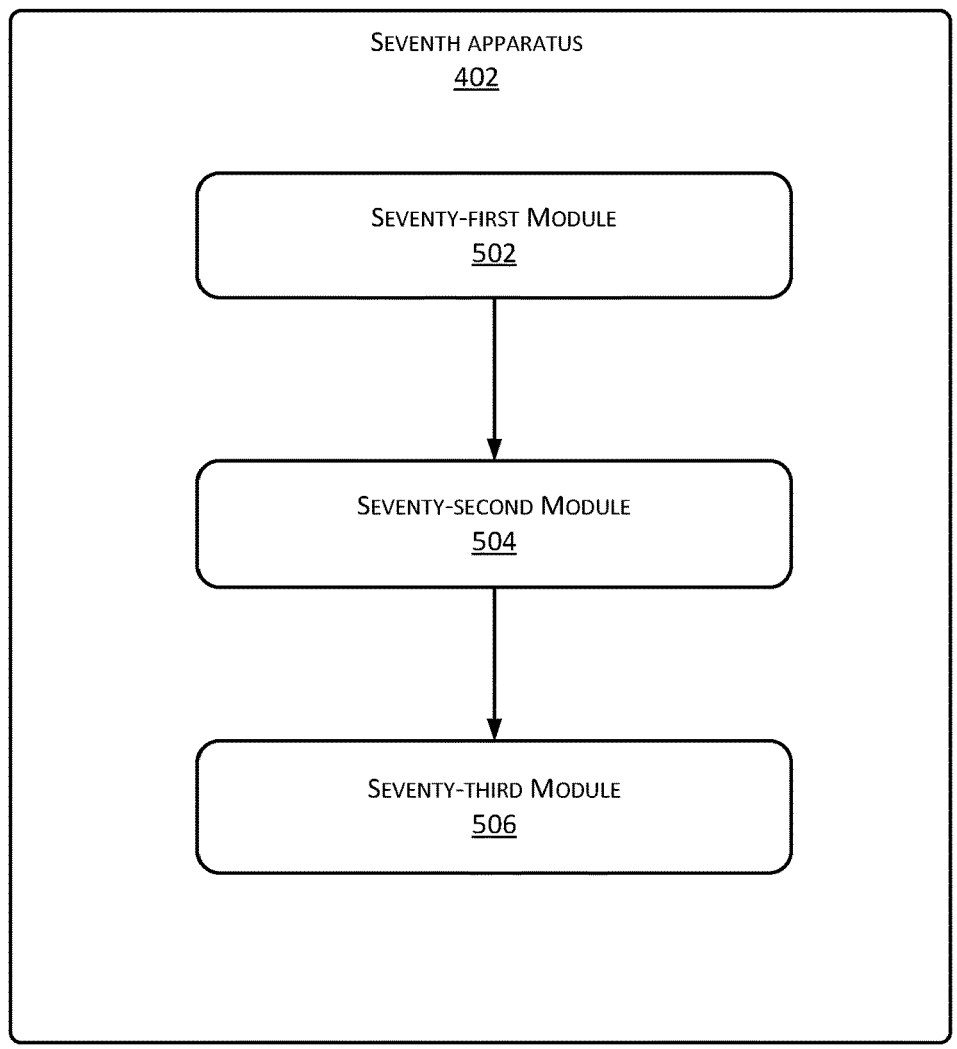
FIG. 5 is a schematic diagram illustrating a seventh apparatus in the device for hot updating libvirt software according to an example embodiment of the present disclosure.

Further, FIG. 5 illustrates a structure diagram of the seventh apparatus 402 in FIG. 4. The seventh apparatus includes:

a seventy-first module 502 that starts a monitor program before the virtual machine status information of the currently running first libvirtd process is imported into the second libvirtd process, the monitor program establishing a connection between the monitor program and the first libvirtd process;

a seventy-second module 504 that controls the monitor program to obtain the second event message sent by the first libvirtd process during the first time period, the second event message being directed to the virtual machine status information of the virtual machine newly created by the first libvirtd process;

a seventh-third module 506 that control the monitor program to establish the connection with the second libvirtd process and adds the newly created virtual machine status information into the second libvirtd process according to the second event message.

The monitor program is connected with both the first libvirtd process and the second libvirtd process to facilitate to send relevant data under such scenario. Both connections are long connections. Relative to the libvirtd process, the monitor program acts as the client terminal. For example, the virtual machine status information is stored in the form of file. The names of the newly created virtual machines are VM4 and VM5. The virtual machine status information is stored in VM4.xml and VM5.xml. Correspondingly, to make the second event message direct to the virtual machine status information of the virtual machine newly created by the first libvirtd process, the information of the second event message includes at least the event of the newly created virtual machine, the identification of the newly created virtual machine (such as the name of the virtual machine). For example, the VM5.xml that stores the virtual machine status information is found based on the virtual machine name VM5.

In actual application, operations other than creating the virtual machine, such as closing the virtual machine, may be started by the virsh tool (or any other management tool program that is written in C or python language) and the QEMU process corresponding to the virtual machine is closed through the libvirtd process. At that time, the monitor program also monitors the event message corresponding to such operations (such as closing the virtual machine) but may omit such irrelevant event message without processing.

Figure 6:
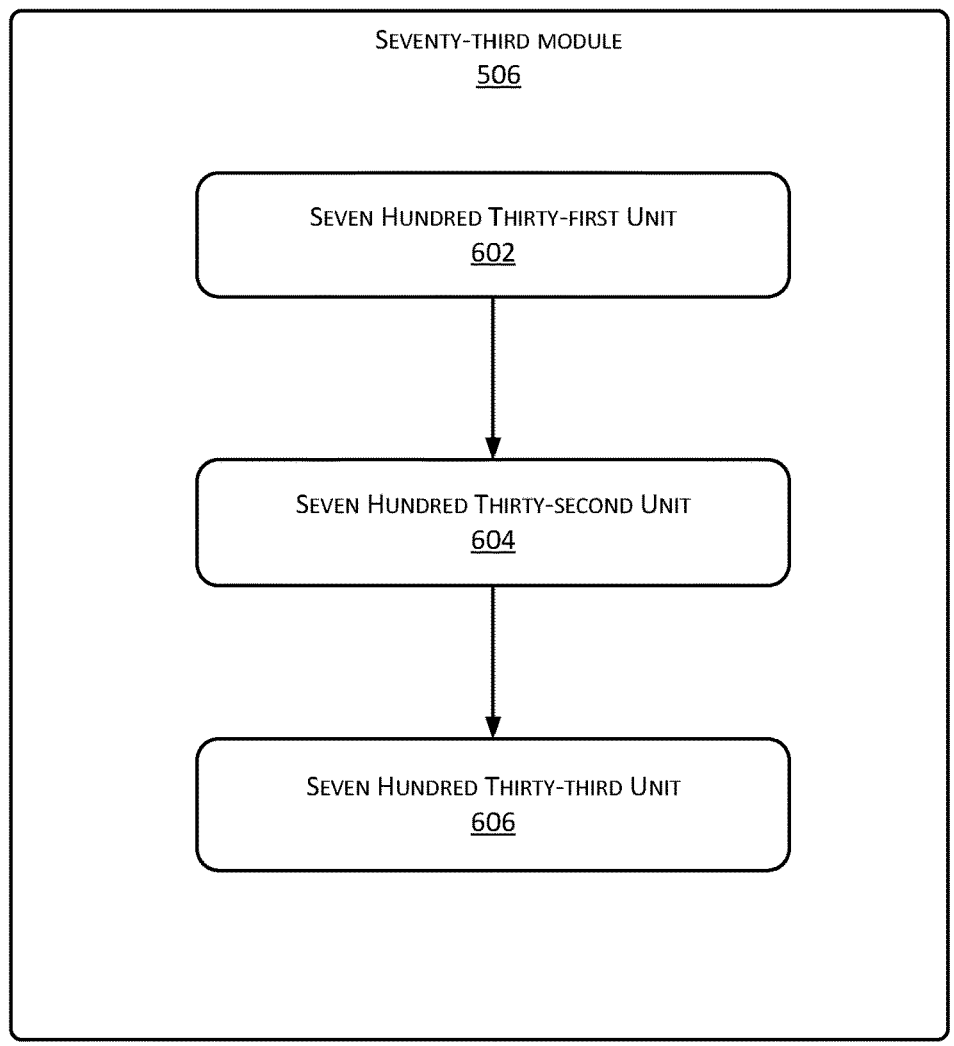
FIG. 6 is a schematic diagram illustrating a seventy-third module of the seventh apparatus in the device for hot updating libvirt software according to an example embodiment of the present disclosure.

Further, the present disclosure provides a seventy-third module. The detailed structure of the seventy-third module 506 may be as shown in FIG. 6, which includes a seven hundred thirty-first unit 602, a seven hundred thirty-second unit 604, and a seven hundred thirty-third unit 606.

The seven hundred thirty-first unit 602 controls the monitor program to establish a connection with the second libvirtd process. The monitor program will wait for the starting of the second libvirtd process before the second libvirtd process is started, and automatically connect with the second libvirtd process after the second libvirtd process is started.

The seven hundred thirty-second unit 604 controls the monitor program to copy the status file of the virtual machine status information of the virtual machine newly created by the first libvirtd process to the virtual machine status file folder corresponding to the second libvirtd process. Following the preceding example, with respect to the newly created virtual machine VM4 and VM5, their virtual machine status information is stored in the status files VM4.xml and VM5.xml. The monitor program copes the two files in the virtual machine stats file folder corresponding to the second libvirtd process.

The seven hundred thirty-third unit 606 controls the monitor program to call the importing interface of the second libvirtd process, and, according to the second event message, controls the importing interface to import the newly created virtual machine status information in the status file to the second libvirtd process and consistently store the virtual machine status information in the virtual machine status file corresponding to the virtual machine status file folder. The second event message includes the event. As the second event message includes the identification of the virtual machine, the importing interface may, according to the identification of the virtual machine, import the virtual machine status information from the file into the second libvirtd process. For example, the VM5.xml file that stores the virtual machine status information may be found according to the virtual machine name VM5.

As another example embodiment, the device 100, reference to both FIG. 4 and FIG. 5, may include an eighth apparatus (not shown in the FIGs). The eighth apparatus, after the second libvirtd process is started, instructs the monitor program to exit. For example, after the second libvirtd process is started, the functions provided by the monitor programs are no longer needed to exist. The instruction will be sent to the monitor program via a specific signal to exit the monitor program.

For example, the connection between the monitor program and the first libvirtd process is read-only connection. The eighth apparatus, after the second libvirtd process is started, instructs the first libvirtd process to check the connection to which it acts as the server terminal. In response to determining that there exists only one client terminal that establishes the connection with the first libvirtd process and such connection is read-only connection, the eighth apparatus instructs the monitor program to exit, thereby realizing that the monitor program effectively exits after the monitor program completes work.

For example, the fourth apparatus instructs the first libvirtd process to check the connection to which it acts as the server terminal, in response to determining that there exists the connection between the client terminal and the first libvirtd process, exits the first libvirtd process. After the first libvirtd process is exited, the connection with the QEMU process is automatically disconnected.

In the actual application, if there is a client terminal that has connection with the first libvirtd process after the first libvirtd process exits, the called functions of the current connection fail. For example, the client terminal connecting to the first libvirtd process has some unfinished operations, after directly exiting the first libvirtd process, these operations fail. Thus, before exiting, whether there is any terminal that has connection with the first libvirtd process is determined to avoid failure of certain operations at the particular time point.

Further, the fourth apparatus, after the first libvirtd process checks the connection to which it acts as the server terminal, if determining that there exists the connection between the client terminal and the first libvirtd process, instructs the first libvirtd process, after satisfying the preset condition, to re-check the connection to which it acts as the server terminal until it is determined that there exists no connection between the client terminal and the first libvirtd process, and exit the first libvirtd process.

For example, the preset condition includes there is a new client terminal that establishes or disconnects the connection with the first libvirtd process. Assuming that the first libvirtd process checks the connection to which it acts as the server terminal and determines that there are two client terminals have established connection with the first libvirtd process, which are client 1 and client 2. When one of the client terminals (such as client 2) disconnect with the first libvirtd process, the first libvirtd process is triggered to re-check the connection to which it acts as the server terminal. In addition, when another client terminal client 3 established the connection with the first libvirtd process, the first libvirtd process is also triggered to re-check the connection to which it acts as the server terminal For another example, the preset condition also includes that a preset time period is passed. Assuming that the first libvirtd process checks the connection to which it acts as the server terminal and determines that there are two client terminals have established connection with the first libvirtd process, timing calculation is started after the check is completed. When the timing calculation reaches a preset time, the first libvirtd process is triggered to re-check the connection to which it acts as the server terminal One of ordinary skill in the art understands that the above preset conditions are just examples. Any other existing or future preset conditions, if applicable by the present disclosure, shall also be included in the present disclosure and be incorporated herein.

Figure 7:
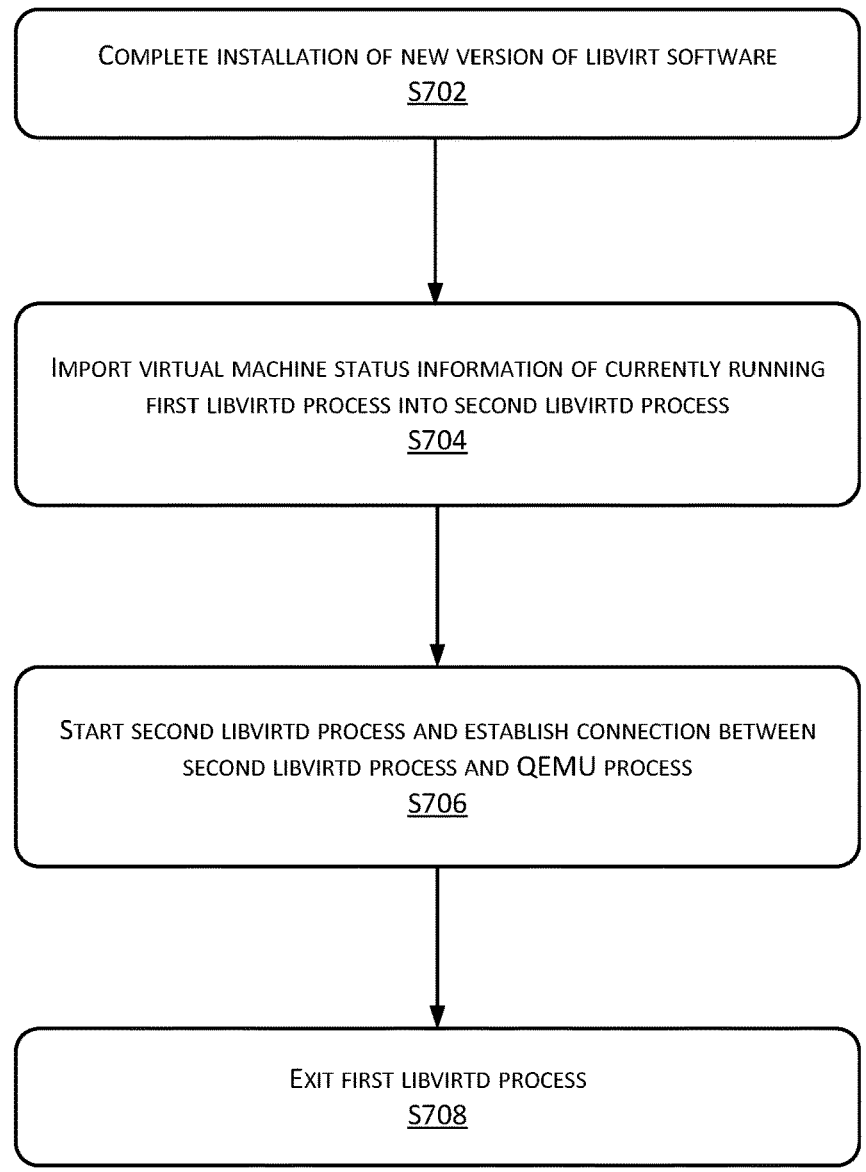
FIG. 7 is a flowchart illustrating a method for hot updating libvirt software according to an aspect of the present disclosure.

FIG. 7 is a flowchart illustrating a method for hot updating libvirt software according to an aspect of the present disclosure, which includes the following steps:

Step S702, completing an installation of a new version of the libvirt software;

Step S704, importing virtual machine status information of a currently running first libvirtd process into a second libvirtd process;

Step S706, starting the second libvirtd process and establishing a connection between the second libvirtd process and the QEMU process;

Step S708, exiting the first libvirtd process.

After the second libvirtd process starts, as the new version of libvirt software has finished installation, the second libvirtd process is already running based on the new version of software code. Meanwhile, the virtual machine status information of the second libvirtd process is updated to be in concert with the first libvirtd process before starting. Thus, the relevant functions of the libvirt software are correctly implemented through the second libvirtd process, thereby avoiding the interruption of the relevant functions of the libvirt software during the updating process.

The libvirt software of the present disclosure includes an API database, a safeguard process such as a libvirtd process, and a command line tool such as virsh tool to make virtualization management of the virtual machine monitor (such as Hypervisor). FIG. 2 is a schematic diagram illustrating functions of the libvirt software under the KVM/QEMI virtual environment. In a running process of the libvirt software, the connection between the virsh tool 210 and the libvirtd process is a short connection, which is disconnected after transmitting data once. In such connection, the virsh tool acts as the client terminal and the libvirtd process 220 acts as the server terminal. The connection between the libvirtd process 220 and the QEMU process 230 is a long connection, which keeps connected after the data transmission is completed until a request to disconnect is received. In such connection, the libvirtd process 220 acts as the client terminal and the QEMU process 230 acts as the server terminal.

The first libvirtd process and the second libvirtd process may be obtained by modifying the original libvirtd process. For example, a label parameter is added into the first libvirtd process and the second libvirtd process. Different label parameters may be imported when starting the processes so that two libvirtd process with different labels co-exist and keep different virtual machine status information. For example, 0 and 1 are used as different label parameters. The first libvirtd process and the second libvirtd process are represented by libvirtd-0 and libvirtd-1 respectively. Each of the libvirtd-0 and libvirtd-1 creates a virtual machine status file to store the virtual machine status information (These files are stored in their corresponding virtual machine status file folders. Each virtual machine corresponds to one status file). During the starting of libvirtd-1, the virtual machine status file of the libvirtd-0 is copied to libvirtd-1 to complete importing of the virtual machine status information.

For the example of the KVM/QEMU virtualization plan, each virtual machine corresponds to a QEMU process. When the QEMU process starts, it is equivalent that a new virtual machine is created. In the virtualization environment as shown in FIG. 2, the libvirtd process acts as the server terminal, receives the command from the virsh tool, and returns the result to the virsh tool. Meanwhile, the libvirtd process, according the command from the virsh tool, further constructs the commands sent to the QEMU process, and sends the command of such construction to the QEMU process as the client terminal, such as stopping/reactivating virtual machine etc. The QEMU process, after receiving the relevant command, executes the corresponding operation and returns the result to the libvirtd process. In addition, the QEMU process may via the monitor (QEMU monitor) actively send the event message to the libvirtd process that is connected to the monitor. For example, after the user closes the virtual machines, the QEMU process sends the event message of stopping event to the libvirtd process to update the virtual machine status information of the libvirtd process.

When the QEMU process starts, a configuration parameter is imported via the libvirtd process to provide a monitor. The monitor is the interactive interface between the QEMU process and the libvirtd process. The data transmission between the libvirtd process and the QEMU process is conducted via the monitor. To resolve the problems of the conventional techniques, the present disclosure configures two libvirtd processes independent to each other, i.e., the first libvirtd process and the second libvirtd process, and provides two monitors independent to each other and used to maintain independent communication with the first libvirtd process and the second libvirtd process respectively. In the example embodiment of the present disclosure, the two different label parameters 0 and 1 are imported to configure the two monitors, such as monitor-0 and monitor-1, to establish connection between libvirtd-0 and monitor-0 and another connection between libvirtd-1 and monitor-1 to conduct independent communication.

For example, the virtual machine status information may be stored in the form of file, table, or memory data. For instance, the virtual machine status information in the example embodiment of the present disclosure may be stored in the form of .xml file. The file may be named after the name of the virtual machine. For the example of the virtual machine named VM1, the corresponding virtual machine status file is VM1.xml. Each libvirtd process has a file folder to save its virtual machine status file. Assuming that there are already three virtual machines are running before the update, their corresponding virtual machine status files are VM1.xml, VM2.xml, and VM3.xml respectively. These files record the virtual machine status information of the above three virtual machines. Before the second libvirtd process is started, the above three virtual machine status files are copied to the virtual machine status file folder of the second libvirtd process. One of ordinary skill in the art understands that the above storage form of the virtual machine status information is just illustrative. Any other existing or future forms of saving the virtual machine status information, if applicable to the present disclosure, shall also be included in the present disclosure and be incorporated herein.

In the actual processing, after the virtual machine status information of the currently running first libvirtd process is imported into the second libvirtd process, and until the second libvirtd process is started and the connection between the second libvirtd process and the QEMU process is established, there is a certain period of processing time. During such period of processing time, if the virtual machine is closed, the second libvirtd process cannot obtain the status change information by importing the virtual machine status information of the first libvirtd process. In addition, as the second libvirtd process has not established the connection with the QEMU process, the stop event of closing the virtual machine corresponding to the QEMU process cannot be sent to the second libvirtd process so that the second libvirtd process cannot obtain the virtual machine status information arising from closing the virtual machine. Thus, after the second libvirtd process and the QEMU process establish the connection, there is a virtual status mistake between the virtual machine status information of the second libvirtd process and the actual running process of the virtual machine.

To further resolve the above problem, the present disclosure provides an example embodiment. Before the first apparatus imports the virtual machine status information of the currently running first libvirtd process into the second libvirtd process, the first event message sent by the QEMU process to the libvirtd process is blocked. After the first libvirtd process is exited, the blocking of the first event message sent by the QEMU process to the first libvirtd process is cancelled.

The first event message includes an event message that the QEMU process sends to the libvirtd process when the virtual machine status changes to inform the libvirtd process that the virtual machine status changes so that the libvirtd process updates its virtual status information according to the first event message. For the example of KVM/QEMU virtualization plan, QEMU process creates the corresponding first event message when the virtual machine status changes and sends the first event message to the libvirtd process. The first event messages may include: stop event, pause event, resume event, etc. These first event messages are created by stopping virtual machine operation, pausing virtual machine operation, and resuming virtual operation respectively. As there are two monitors configured for the QEMU process, the first event message, after it's created, will be sent via the two monitors to the two libvirtd processes corresponding to the two monitors respectively. When the connection between the libvirtd process and the monitor is normal, the first event message reaches the libvirtd process. In this example, when the first event message is created, if the second libvirtd process has not established the connection with the QEMU process, the first event message cannot be delivered.

After the first event message sent by the QEMU process to the libvirtd process is blocked, the first event message, after it's created, will not be sent to any libvirtd process. Instead, the QEMU process stores the first event message internally. After the first libvirtd process exits, the block of the first event message sent by the QEMU process to the libvirtd process is cancelled. After the block is cancelled, the first event message sent by the QEMU process to the libvirtd process may include:

1. a first event message that is blocked and stored internally in the QEMU process. If prior to the cancellation of the block, there is the first event message that occurs and is blocked. After the cancellation of the block, the first event message is continuously to be sent;

2. a first event message is newly created after the block. As the second libvirtd process has established connection with the QEMU process, the second libvirtd process receives the first event message that is created after the second libvirtd process imports the virtual machine status information of the currently running first libvirtd process into the second libvirtd process until that the third apparatus starts the second libvirtd process, and before that the second libvirtd process and the QEMU process establish the connection. Thus, the virtual machine status information is updated to avoid the mistake of the virtual machine status. The libvirtd process refers to both the first libvirtd process and the second libvirtd process. That is, the first event message sent by the QEMU process to the libvirtd process are sent to the first libvirtd process and the second libvirtd process simultaneously. If the first libvirtd process and the second libvirtd process are in the starting status and establish the connection with the monitor of the QEMU process, the first event message is received. For the same reason, after the block, the first event message is not sent to either the first libvirtd process or the second libvirtd process.

For example, the blocking of the first event message sent by the QEMU process to the currently running first libvirtd process includes that: the currently running first libvirtd process sends the first command to the QEMU process; and the QEMU process pauses to send the first event message to the libvirtd process. The cancellation of the blocking of the first event message sent by the QEMU process to the first libvirtd process includes that: the currently running second libvirtd process sends the second command to the QEMU process; and the QEMU process resumes to send the first event message to the second libvirtd process according to the second command. Following the preceding example, the first command and the second command may be implemented using the commonly used QEMU monitor command in the KVM/QEMU virtualization plan. QEMU monitor commands used to block and cancel block are added respectively, and, through the QEMU process, are used to block or cancel block respectively after receiving the corresponding QEMU monitor command.

One of ordinary skill in the art understands that the above first command and the second command are just example. Any other existing or future commands that controls the QEMU process to pause or resume to send the first event message to the libvirtd process, if applicable by the present disclosure, are also included in the present disclosure, and incorporated herein by reference.

For example, the starting the second libvirtd process includes the following. When the second libvirtd process is started, the second libvirtd process creates a connection path corresponding to the second libvirtd process. The connection path corresponding the second libvirtd process is used to establish the connection between the client terminal and the second libvirtd process. After the second libvirtd process is started, the client terminal, selects the connection path corresponding to the second libvirtd process to establish the connection with the second libvirtd process according to the creation time of the connection path of the libvirtd process. The client terminal may be a device that configured with the virsh tool or any other device or program that attempts to connect with the libvirtd process.

With respect to the connection paths that are created sequentially, the latest created connection path may be selected in priority. Following the above example, the connection path may be the domain socket path of the second libvirtd process as the server terminal. The domain socket path is automatically created when the libvirtd process is started. Following the preceding example of the two libvirtd processes, i.e., libvirtd-0 and libvirtd-1, each of the two libvirtd processes has independent domain socket path. When libvirtd-0 and libvirtd-1 are started, the created domain socket paths are/var/run/libvirt/libvirt-sock-1 and /va/run/libvirt/libvirt-sock-2. It is assumed that libvirtd-0 is the process that is running before the version update and libvirtd-1 is the newly started libvirtd process, the generation time of the domain socket path as the serve terminal in libvirtd-0 is t1, the generation time of the domain socket path as the serve terminal in libvirtd-1 is t2, and t2 is later than t1. In this example embodiment, as t2 is later than t1, the client terminal will select to establish the connection with libvirtd-1 in priority and then the command sent by the client terminal to the libvirtd process will only be sent to libvirtd-1.

Thus, when two libvirtd processes are running simultaneously, if a device configured with virsh tool (or another management tool program written in c or python language) needs to configure the virtual machine), the configuration command will be sent to the newly started second libvirtd process.

Before the second libvirtd process is started, the client terminal attempting to connect with the libvirtd process will continue to connect with the original first libvirtd process. In the KVM/QEMU virtualization plan in the example embodiment of the present disclosure, the operation that creates the new virtual machine need the device configured with virsh tool to send the command to the libvirtd process and then the libvirtd process configures the QEMU process according to the command. Thus, in a time period after the second apparatus 120 imports the virtual machine status information of the currently running first libvirtd process into the second libvirtd process and before the third apparatus 130 starts the second libvirtd process, the second libvirtd process has not finished starting. If a new virtual machine is created then, the generation is conducted through the original first libvirtd process and the second libvirtd process cannot update the virtual machine status information of the newly created virtual machine, which may cause the omission of the newly created virtual machine status information.

With respect to the above problem, the present disclosure further provides an example embodiment, which is implemented through adding a step to obtain and add the newly add the newly created virtual machine status information. The step includes: obtaining the virtual machine status information of the new virtual machines that is newly created by the first libvirtd process during the first time period, and adding the newly created virtual machine status information into the virtual machine status information of the second libvirtd process. The first time period is a time period from the time that the virtual machine status information of the currently running first libvirtd process is imported into the second libvirtd process to the time that the second libvirtd process is started.

The virtual machine status information of the new virtual machine created before the first time period is written into the virtual machine status file of the second libvirtd process through importing. The second libvirtd process creates the new virtual machine after the first time period and thus the second libvirtd process directly obtains the virtual machine status information of the newly created virtual machine. The present disclosure obtains the virtual machine status information of the virtual machine newly created by the first libvirtd process during the first time period, and adds the newly created virtual machine status information into the virtual machine status information of the second libvirtd process, thereby avoiding the omission of the newly created virtual machine status information.

Figure 8:
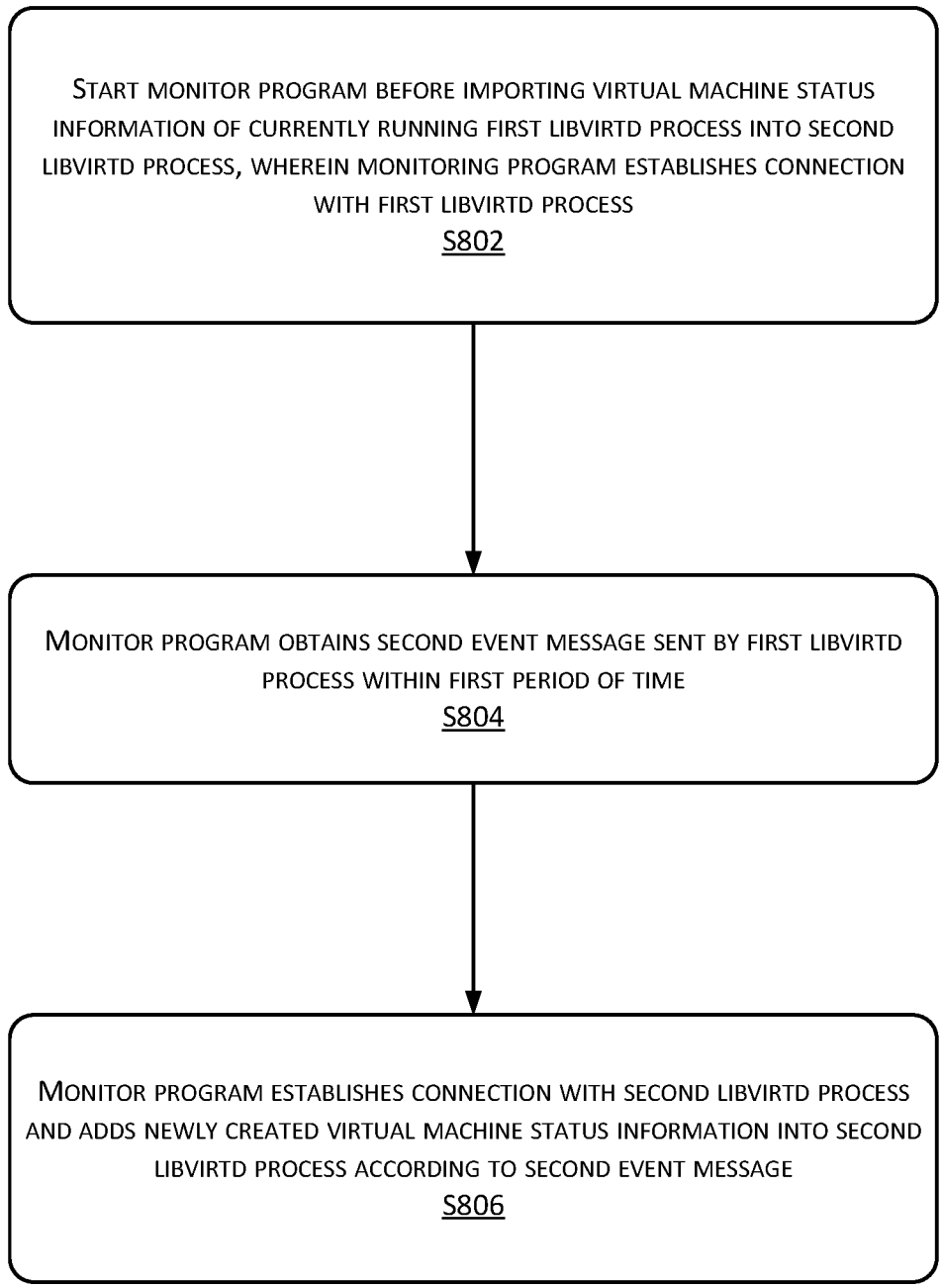
FIG. 8 is a flowchart illustrating an example method for hot updating libvirt software according to an aspect of the present disclosure.

Further, with reference to FIG. 7, FIG. 8 is a flowchart illustrating an example method for hot updating libvirt software according to an example embodiment of the present disclosure.

The above described step that obtains and adds the newly created virtual machine status information includes the following steps:

Step S802, a monitor program is started before the virtual machine status information of the currently running first libvirtd process is imported into the second libvirtd process. There is a connection established between the monitor program and the first libvirtd process;

Step S804, the monitor program obtains the second event message sent by the first libvirtd process during the first time period. The second event message is directed to the virtual machine status information of the virtual machine newly created by the first libvirtd process;

Step S806, the monitor program establishes the connection with the second libvirtd process and adds the newly created virtual machine status information into the second libvirtd process according to the second event message.

The monitor program is connected with both the first libvirtd process and the second libvirtd process to facilitate to send relevant data under such scenario. Both connections are long connections. Relative to the libvirtd process, the monitor program acts as the client terminal. For example, the virtual machine status information is stored in the form of file. The names of the newly created virtual machines are VM4 and VM5. The virtual machine status information is stored in VM4.xml and VM5.xml. Correspondingly, to make the second event message direct to the virtual machine status information of the virtual machine newly created by the first libvirtd process, the information of the second event message includes at least the event of the newly created virtual machine, and the identification of the newly created virtual machine (such as the name of the virtual machine). For example, the VM5.xml that stores the virtual machine status information is found based on the virtual machine name VM5.

In actual application, operations other than creating the virtual machine, such as closing the virtual machine, may also be started by the virsh tool (or any other management tool program that is written in C or python language) and the QEMU process corresponding to the virtual machine is closed through the libvirtd process. At that time, the monitor program also monitors the event message corresponding to such operations (such as closing the virtual machine) but may omit such irrelevant event message without processing.

Figure 9:
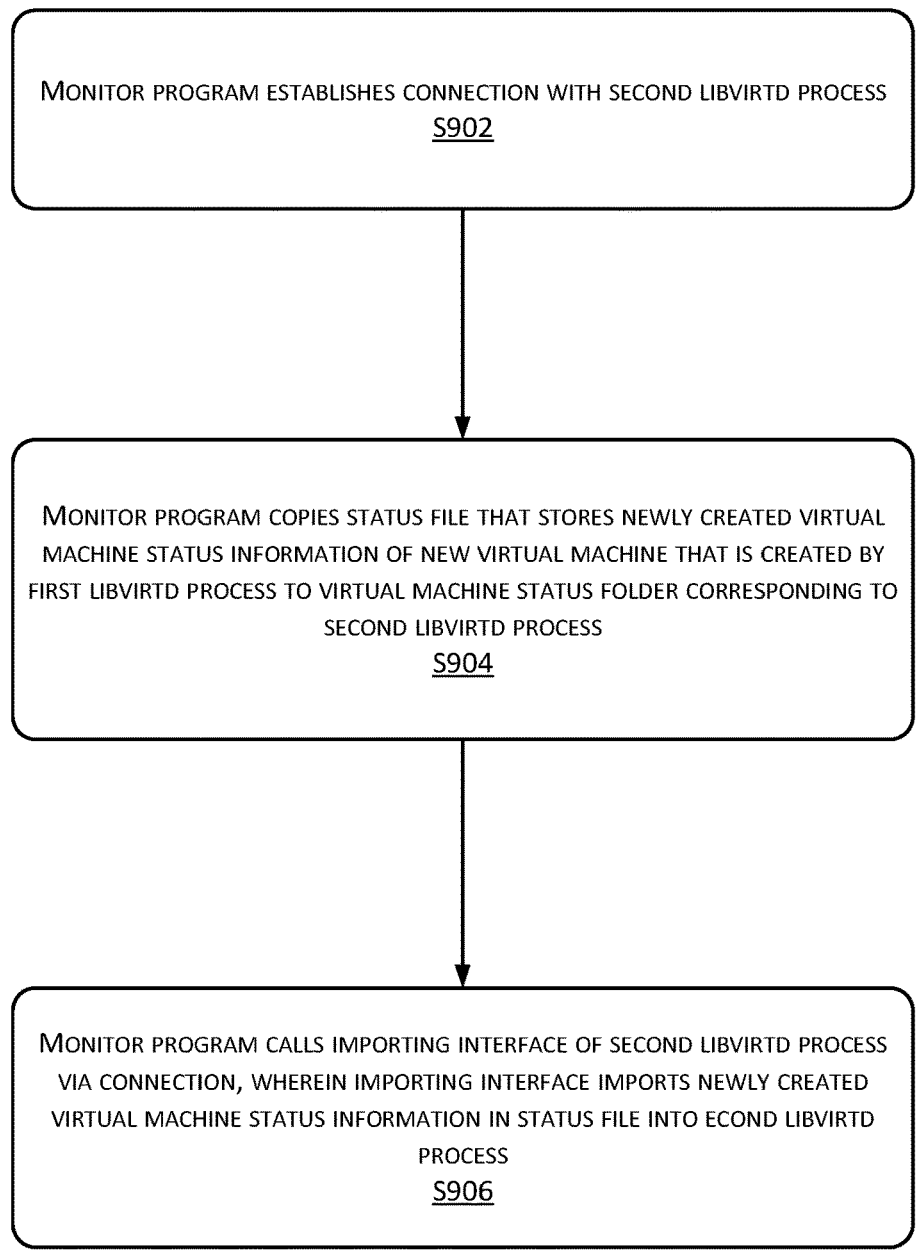
FIG. 9 is a flowchart illustrating another example method for hot updating libvirt software according to an aspect of the present disclosure.

Further, with reference to FIG. 7 and FIG. 8, FIG. 9 is a flowchart illustrating an example method for further hot updating libvirt software. The detailed processing steps of the above step S806 include:

Step S902, the monitor program establishes a connection with the second libvirtd process. The monitor program will wait for the starting of the second libvirtd process before the second libvirtd process is started, and automatically connect with the second libvirtd process after the second libvirtd process is started.

Step S904, the monitor program copies the status file of the virtual machine status information of the virtual machine newly created by the first libvirtd process to the virtual machine status file folder corresponding to the second libvirtd process. Following the preceding example, with respect to the newly created virtual machine VM4 and VM5, their virtual machine status information is stored in the status files VM4.xml and VM5.xml. The monitor program copes the two files in the virtual machine stats file folder corresponding to the second libvirtd process.

Step S906, the monitor program calls the importing interface of the second libvirtd process via the connection. The instruction interface, according to the second event message, imports the newly created virtual machine status information in the status file to the second libvirtd process and consistently stores the virtual machine status information in the virtual machine status file corresponding to the virtual machine status file folder. The second event message includes the event. As the second event message includes the identification of the virtual machine, the importing interface may, according to the identification of the virtual machine, import the virtual machine status information from the file into the second libvirtd process. For example, the VM5.xml file that stores the virtual machine status information may be found according to the virtual machine name VM5.

As another example embodiment, in the above method, after the second libvirtd process is started, the monitor program exits. For example, after the second libvirtd process is started, the functions provided by the monitor programs are no longer needed to exist. The instruction will be sent to the monitor program via a specific signal to exit the monitor program.

For example, the connection between the monitor program and the first libvirtd process is read-only connection. The eighth apparatus, after the second libvirtd process is started, instructs the first libvirtd process to check the connection to which it acts as the server terminal. In response to determining that there exists only one client terminal that establishes the connection with the first libvirtd process and such connection is read-only connection, the eighth apparatus instructs the monitor program to exit, thereby realizing that the monitor program effectively exits after the monitor program completes work.

For example, the exit of the first libvirtd process includes that: The first libvirtd process checks the connection to which it acts as the server terminal. In response to determining that there exists the connection between the client terminal and the first libvirtd process, the first libvirtd process is exited. After the first libvirtd process is exited, the connection with the QEMU process is automatically disconnected.

In the actual application, if there is a client terminal that has connection with the first libvirtd process after the first libvirtd process exits, the called functions of the current connection fail. For example, the client terminal connecting to the first libvirtd process has some unfinished operations, after directly exiting the first libvirtd process, these operations fail. Thus, before exiting, whether there is any terminal that has connection with the first libvirtd process is determined to avoid failure of certain operations at the particular time point.

Further, after the first libvirtd process checks the connection to which it acts as the server terminal, the method may further include: if determining that there exists the connection between the client terminal and the first libvirtd process, the first libvirtd process, after satisfying the preset condition, re-checks the connection to which it acts as the server terminal until it is determined that there exists no connection between the client terminal and the first libvirtd process, and the first libvirtd process is exited.

For example, the preset condition includes there is a new client terminal that establishes or disconnects the connection with the first libvirtd process. Assuming that the first libvirtd process checks the connection to which it acts as the server terminal and determines that there are two client terminals that have established connection with the first libvirtd process, which are client 1 and client 2. When one of the client terminals (such as client 2) disconnect with the first libvirtd process, the first libvirtd process is triggered to re-check the connection to which it acts as the server terminal. In addition, when another client terminal client 3 established the connection with the first libvirtd process, the first libvirtd process is also triggered to re-check the connection to which it acts as the server terminal For another example, the preset condition also includes that a preset time period is passed. Assuming that the first libvirtd process checks the connection to which it acts as the server terminal and determines that there are two client terminals have established connection with the first libvirtd process, timing calculation is started after the check is completed. When the timing calculation reaches a preset time, the first libvirtd process is triggered to re-check the connection to which it acts as the server terminal One of ordinary skill in the art understands that the above preset conditions are just examples. Any other existing or future preset conditions, if applicable by the present disclosure, shall also be included in the present disclosure and be incorporated herein.

FIG. 10(a) to FIG. 10(f) are diagrams illustrating the interactive principles when the method of the example embodiment of the present disclosure is applied to hot update the libvirt software in KVM/QEMU virtualization environment. In the actual application, to implement the techniques of the present disclosure, the computer-readable instructions or codes of the current libvirt software need to be at least modified as follows:

1. A label parameter is added for each libvirtd process. The label parameter 0 or 1 is imported into when starting so that two libvirtd processes with the labels 0 and 1 co-exist, which is referred to as libvirtd-0 and libvirtd-1. The two libvirtd processes have their own files to save the virtual machine status information, each of which acts as the server terminal of the domain socket path.

2. When creating the virtual machine and configuring the QEMU process, the libvirtd process configured two monitors and transfers different label parameters, i.e., monitor-0 and monitor-1, to the two monitors respectively. Libvirtd-0 is connected with monitor-0 while libvirtd-1 is connected with monitor-1.

3. The client terminal (such as the virsh tool), when connecting with the libvirtd process, will select the latest created domain socket path in priority, if there are two domain socket paths.

4. A SIG_USR1 signal processing function is added for the libvirtd process. After the SIG_USR1 signal is received, its connection as the server side is checked. When the current connection with the client has only one read-only connection, SIG_TERM signal is sent to the designated program. The process automatically exits when there is no current connection.

5. The QEMU process is modified to add blocking or pending event or cancel blocking or pending event function sent to the libvirtd process, and add to add the corresponding QEMU monitor command to control the QEMU process to conduct blocking or pending or cancel blocking or pending.

6. An importing interface is added for the libvirtd process. The interface is called to read and import the virtual machine status information from the virtual machine status file of another libvirtd process.

Figure 10A:
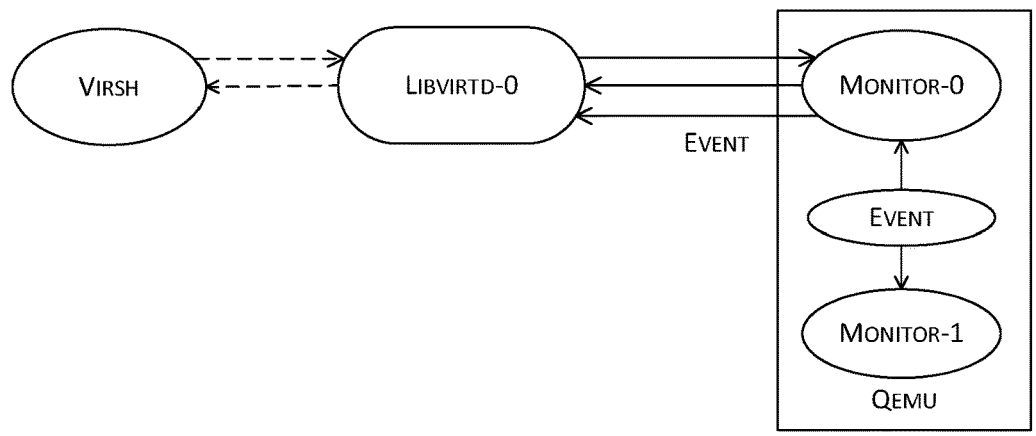
FIG. 10(a) to FIG. 10(f) are diagrams illustrating the interactive principles when the method of the example embodiment of the present disclosure is applied to hot update the libvirt software.

Assuming that in the current situation, libvirtd-0 is in the running status and libvirtd-1 is not started yet. As shown in FIG. 10(a), virsh will, when needed, establish the short connection with libvirtd-0 as the client terminal and send the corresponding command. Virsh as shown in the figure shall be understood as one or one type of device or program that implements the similar functions, and is not limited to the number as shown in the figure. Its function may refer to the virsh tool 210 as shown in FIG. 2. The QEMU process sends the event to the libvirtd process via its configured monitor. Any event will be sent to libvirtd-0 and libvirtd-1 via monitor-0 and monitor-1 respectively. As libvirtd-1 is not started then, the event will only be sent to libvirtd-0.

Figure 10B:
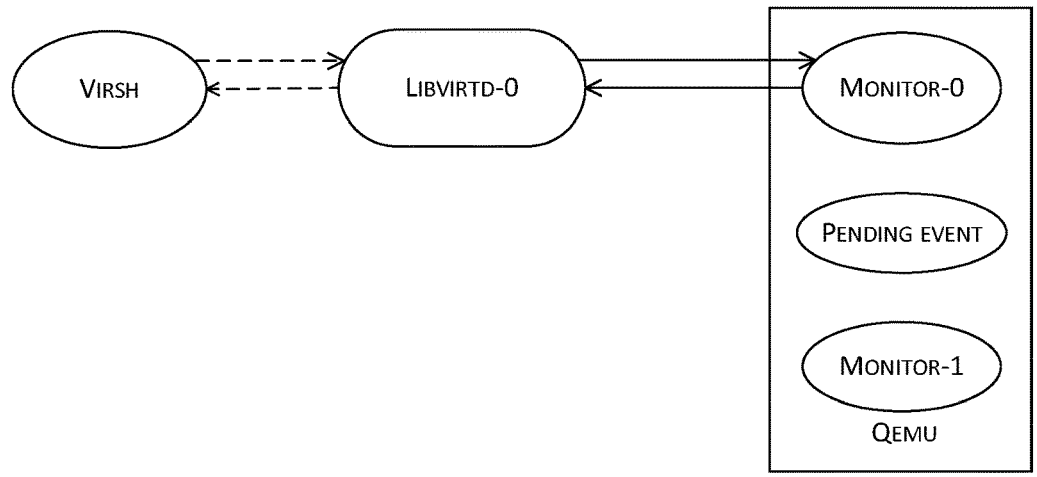
Figure 10C:
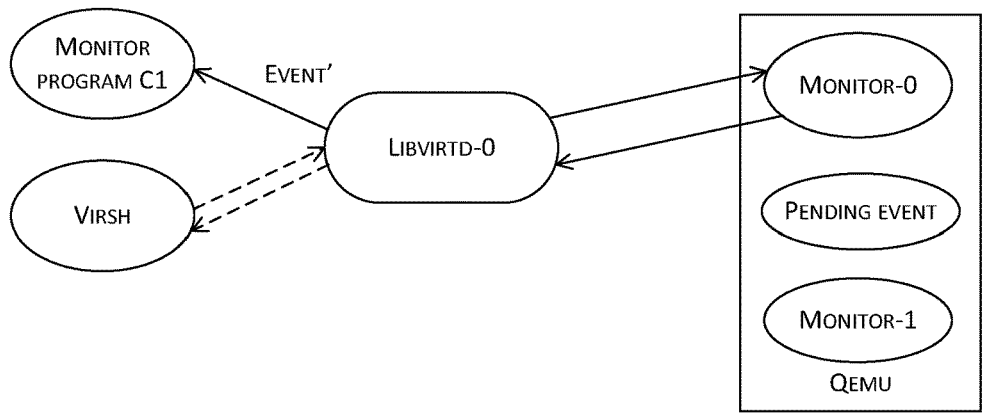
Figure 10D:
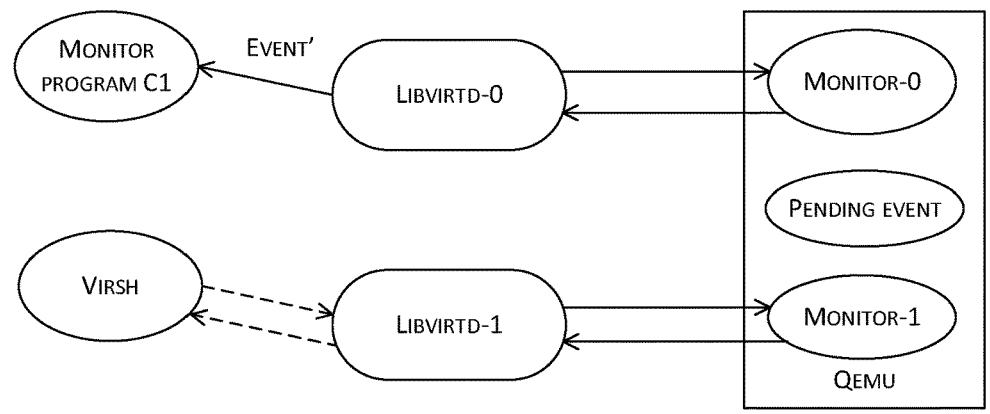

During hot update, the following process may be used;
1. installing the new version of libvirt software.
2. pending the event sent by the QEMU process to the libvirtd process. FIG. 10(b) illustrates the current data interaction figure. As the QEMU process pends the event sent to the libvirtd process, the event originally needed to be sent is stored inside the QEMU process and the sending is paused.
3. starting the monitor program C1, which is connected to the currently running libvirtd-0 in read-only form (long connection), to monitor libvirt-0. FIG. 10(c) illustrates the data interactive figure then. When the new virtual machine is created via libvirtd-0, libvirtd-0 will send the corresponding event to the monitor program C1.

4. importing the virtual machine status information of libvirtd-0 into libvirtd-1 and then starting libvirtd-1. FIG. 10(c) illustrates the data interactive figure then. When libvirtd-1 is started, the domain socket path is created. When both libvirtd-0 and libvirtd-1 are running simultaneously, the client terminal, when attempting to establish connection, will connect the latest created domain socket path in priority. Thus, after libvirtd-1 is started, virsh that attempts to establish the short connection will be automatically connected with libvirtd-1.

At the meantime, if, after the virtual machine status information of libvirtd-0 is imported into libvirtd-1, a new virtual machine is created via the connection of libvirtd-0, the monitor program started at the preceding step will monitor the corresponding event. The monitor program will import the newly created virtual machine status information into libvirtd-1 via the importing interface of libvirtd-1.

Figure 10E:
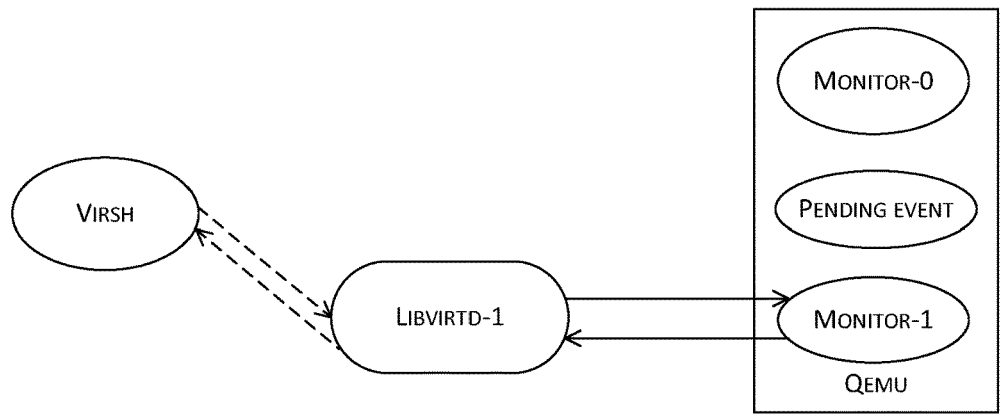

5. Sending the SIG_USR1 signal to libvirtd-0. After receiving the signal, libvirtd-0 checks the connection to which it acts as the server terminal. When only one client terminal establishes the read-only connection with libvirtd-0, libvirtd-0 sends a SIG_TERM signal to the monitor program and the monitor program exits. When there is no client terminal that has connection with libvirtd-0, libvirtd-0 exits. After libvirtd-0 exits, the connection to which libvirtd-0 acts as the client terminal (connection with monitor-0) will be automatically disconnected. FIG. 10(e) illustrates the data interactive figure then.

Figure 10F:
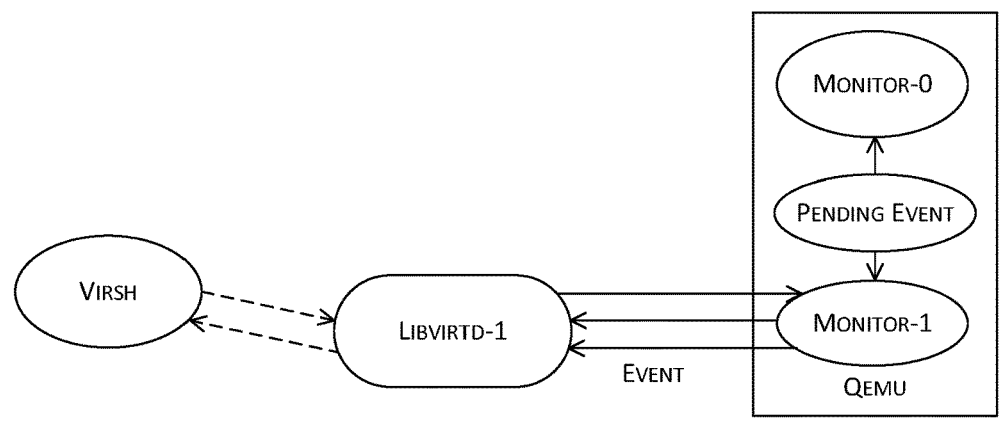

6. cancelling the pending of the event from the QEMU process to the libvirtd process. FIG. 10(f) illustrates the data interactive figure then. The event that is stored inside the process and paused to send after the pending is resumed to be sent. The subsequently created event is also sent normally.

At that time libvirtd-1 is running based on the updated libvirt software code, i.e., the update process is completed. Subsequently, the above process only needs to be repeated. Libvirtd-0 is started and libvirtd-1 is exited. Another hot update is realized.

Overall, after the new second libvirtd process is started, as the new version of libvirt software has finished installation, the second libvirtd process is already running based on the new version of software code. At the same time, the virtual machine status information of the second libvirtd process is updated to be in conformity with the first libvirtd process before the second libvirtd process is started. Thus, the relevant functions of the libvirt software may be implemented correctly through the second libvirtd process, thereby avoiding the interruption of the relevant functions of the libvirt software.

In addition, the present disclosure blocks or unblocks the first event message sent by the QEMU process to the libvirtd process at specific time and monitors the operations that the first libvirtd process creates the new virtual machine during the first time period, thereby avoiding the mistake of the virtual machine status information of the second libvirtd process.

The present disclosure provides a method for hot updating libvirt software, the method comprising:

completing installing a version of libvirt software;

introducing virtual machine status information of a currently running first libvirtd process into a second libvirtd process, wherein the first libvirtd process is running based on a previous version of the libvirt software and the second libvirtd process is running based on a new version of the libvirt software;

starting the second libvirtd process and establishing a connection between the second libvirtd process and a process of a machine emulator (QEMU); and exiting the first libvirtd process.

For example, the method further comprises:

prior to the introducing the virtual machine status information of the currently running first libvirtd process into the second libvirtd process, blocking a first event message sent by the QEMU process to a libvirtd process, wherein the first event message includes an event message that the QEMU process sends to the libvirtd process when a virtual machine status changes; and after the exiting the first libvirtd process, cancelling the blocking of the first event message sent by the QEMU process to a libvirtd process.

For example, the blocking the first event message sent by the QEMU process to the libvirtd process includes:

sending a first command by the currently running first libvirtd process to the QEMU process, wherein the EMU process pauses to send the first event message to the libvirtd process according to the first command; and the cancelling the blocking of the first event message sent by the QEMU process to the process includes:

sending a second command by the currently running second libvirtd process to the QEMU process, wherein the QEMU process resumes to send the first event message to the libvirtd process according to the second command.

For example, the starting the second libvirtd process includes:

when the second libvirtd process is started, the second libvirtd process creates a connection path corresponding to the second libvirtd process, the connection path corresponding to the second libvirtd process being used to establish a connection between a client terminal and the second libvirtd process; and prior to the exiting the first libvirtd process, the client terminal, after the starting the second libvirtd process, selects the connection path corresponding to the second libvirtd process to establish the connection with the second libvirtd process according to a creation time of the connection path of the libvirtd process.

For example, the method further comprises:

prior to starting the second libvirtd process, obtaining newly created virtual machine status information of a new virtual machine created by the first libvirtd process within a first time period and adding the newly created virtual machine state information into virtual machine status information of the second libvirtd process, wherein the first time period is a time period between a time that virtual machine status information of the currently running first libvirtd process is imported into the second libvirtd process to a time that the second libvirtd process is started.

For example, the obtaining the newly created virtual machine status information of the new virtual machine created by the first libvirtd process within the first time period and adding the newly created virtual machine state information into the virtual machine status information of the second libvirtd process includes:

prior to introducing the virtual machine status information of the currently running first libvirtd process into the second libvirtd process, starting a monitor program, the monitor program establishing a connection with the first libvirtd process, wherein:

the monitor program obtains a second event message sent by the first libvirtd process in the first time period, the second event message being directed to the newly created virtual machine status information of the new virtual machine that is created by the first libvirtd process; and the monitor program establishes the connection with the second libvirtd process and adds the newly created virtual machine status information into the second libvirtd process according to the second event message.

For example, the monitor program establishes the connection with the second libvirtd process and adds the newly created virtual machine status information into the second libvirtd process according to the second event message, which includes that;

establishing, by the monitor program, the connection with the second libvirtd process;

copying, by the monitor program, a status file that stores the newly created virtual machine status information of the new virtual machine that is created by the first libvirtd process into a virtual machine status file folder corresponding to the second libvirtd process; and calling, by the monitor program, an importing interface of the second libvirtd process through the connection, wherein the importing interface imports the newly created virtual machine status information in the status file into the second libvirtd process.

For example, the method further comprises:

after the starting the second libvirtd process, exiting the monitor program.

For example, the connection between the monitor program and the first libvirtd process is a read-only connection; and the exiting the monitor program includes:

checking, by the first libvirtd process, the connection to which the first libvirtd process acts as a server terminal; and in response to determining that there exists only one client terminal that establishes the connection with the first libvirtd process and the connection is read-only connection, instructing the monitor program to exit.

For example, the exiting the first libvirtd process includes:

checking, by the first libvirtd process, the connection to which it acts as the server terminal, and in response to determining that there exists no client terminal that establishes the connection with the first libvirtd process, exiting the first libvirtd process.

For example, the method further comprises:

after the checking by the first libvirtd process the connection to which it acts as the server terminal, in response to determining that there exists the connection between the client terminal and the first libvirtd process, re-checking, by the first libvirtd process, after satisfying a preset condition, the connection to which it acts as the server terminal until it is determined that there exists no connection between the client terminal and the first libvirtd process; and exiting the first libvirtd process.

For example, the preset condition includes:

that there is a new client terminal that establishes or disconnects the connection with the first libvirtd process; or that a preset time period is passed.

The present disclosure also provides a device for hot updating libvirt software, the device comprising:

a first apparatus that completes an installation of a new version of the libvirt software;

a second apparatus that imports virtual machine status information of a currently running first libvirtd process into a second libvirtd process, wherein the first libvirtd process is running based on a previous version of the libvirt software and the second libvirtd process is running based on a new version of the libvirt software;

a third apparatus that starts the second libvirtd process and establishes a connection between the second libvirtd process and a process of a machine emulator (QEMU); and a fourth apparatus that exits the first libvirtd process.

For example, the device further comprises a fifth apparatus that:

prior to introducing the virtual machine status information of the currently running first libvirtd process into the second libvirtd process, blocks a first event message sent by the QEMU process to the libvirtd process, wherein the first event message includes an event message that the QEMU process sends to the libvirtd process when the virtual machine status changes; and after exiting the first libvirtd process, cancels the blocking of the first event message sent by the QEMU process to a libvirtd process.

For example, the fifth apparatus, prior to introducing the virtual machine status information of the currently running first libvirtd process into the second libvirtd process, instructs the currently running first libvirtd process to send a first command to the QEMU process, wherein the EMU process pauses to send the first event message to the libvirtd process according to the first command; and after exiting the first libvirtd process, instructs the currently running second libvirtd process to send a second command to the QEMU process, wherein the QEMU process resumes to send the first event message to the libvirtd process according to the second command.

For example, the third apparatus, when the second libvirtd process is started, creates a connection path corresponding to the second libvirtd process for the second libvirtd process, the connection path corresponding to the second libvirtd process being used to establish a connection between the client terminal and the second libvirtd process; and the device further comprises a sixth apparatus that, prior to exiting the first libvirtd process, instructs the client terminal, after the second libvirtd process is started, selects the connection path corresponding to the second libvirtd process to establish the connection with the second libvirtd process according to a creation time of the connection path of the libvirtd process.

For example, the device further comprises a seventh apparatus that, prior to starting the second libvirtd process, obtains newly created virtual machine status information of a new virtual machine created by the first libvirtd process within a first time period and adds the newly created virtual machine state information into virtual machine status information of the second libvirtd process, wherein the first time period is a time period between a time that the virtual machine status information of the currently running first libvirtd process is imported into the second libvirtd process and a time that the second libvirtd process is started.

For example, the seventh apparatus includes:

a seventy-first module that, prior to introducing the virtual machine status information of the currently running first libvirtd process into the second libvirtd process, starts a monitor program, wherein there is a connection established between the monitor program and the first libvirtd process;

a seventy-second module that controls the monitor program to obtain a second event message sent by the first libvirtd process in the first time period, the second event message being directed to the newly created virtual machine status information of the new virtual machine that is created by the first libvirtd process; and a seventy-third module that controls the monitor program to establish the connection with the second libvirtd process and adds the newly created virtual machine status information into the second libvirtd process according to the second event message.

For example, the seventy-third module includes:

a seven hundred thirty-first unit that controls the monitor program to establish the connection with the second libvirtd process;

a seven hundred seventy-second unit that controls the monitor program to copy a status file that stores the newly created virtual machine status information of the new virtual machine that is created by the first libvirtd process into a virtual machine status file folder corresponding to the second libvirtd process; and a seven hundred seventy-third unit that controls the monitor program to call the importing interface of the second libvirtd process through the connection, and controls the importing interface to import the newly created virtual machine status information in the status file into the second libvirtd process.

For example, the device further comprises an eighth apparatus that, after the second libvirtd process is started, instructs the monitor program to exit.

For example, the connection between the monitor program and the first libvirtd process is a read-only connection; and the eighth apparatus, after the second libvirtd process is started, instructs the first libvirtd process to check the connection to which the first libvirtd process acts as the server terminal, and, in response to determining that there exists only one client terminal that establishes the connection with the first libvirtd process and the connection is read-only connection, instructs the monitor program to exit.

For example, the fourth apparatus further instructs the first libvirtd process to check the connection to which the first libvirtd process acts as the server terminal, and, in response to determining that there exists no client terminal that establishes the connection with the first libvirtd process, exits the first libvirtd process.

For example, the fourth apparatus, after the first libvirtd process checks the connection to which it acts as the server terminal, in response to determining that there exists the connection between the client terminal and the first libvirtd process, instructs the first libvirtd process, after satisfying a preset condition, to re-check the connection to which the first libvirtd process acts as the server terminal until it is determined that there exists no connection between the client terminal and the first libvirtd process, and then exits the first libvirtd process.

For example, the preset condition includes:

that there is a new client terminal that establishes or disconnects the connection with the first libvirtd process; or that a preset time period is passed.

Obviously, those skilled in the art may make various modifications and variations of the present disclosure without departing from the spirit and scope of the present disclosure. Thus, if these modifications and variations of the present disclosure of the present disclosure claims and their equivalents within the scope thereof, the present disclosure is intended to cover these modifications and variations.

It should be noted that, the present disclosure may be implemented in software and/or a combination of software and hardware. For example, the present disclosure may employ Application-specific integrated circuit (ASIC), a general purpose computer or any other similar hardware implemented. In one example embodiment, the software program of the present disclosure may be executed to implement the above steps or functions by one or more processors. Likewise, the software programs (including associated data structures) may be stored in a computer-readable recording medium, e.g., RAM memory, magnetic or optical drive or a floppy disk and the like. Further, some steps or functions of the present disclosure can be implemented in hardware, e.g., circuit cooperated with the processor to perform the respective steps or functions of the circuit.

Further, a portion of the present disclosure may be applied as computer program product, such as computer program instructions which, when executed by a computer, by operating of the computer, calls a method and/or technical solutions according to the application. The program instructions to call the method of the present disclosure, may be stored in fixed or removable recording medium, and/or be transmitted by data stream through data broadcast or other signal bearing medium stream, and/or stored in accordance with the working memory of a computer device running said program instructions. Here, one example embodiment of the present disclosure includes a device including a memory for storing computer program instructions and a processor for executing program instructions, wherein, when the computer program instructions are executed by the processor, the device is triggered to perform the methods and/or technical solutions of the preceding various example embodiments of the present disclosure.

To those skilled in the art, it is apparent that the present disclosure is not limited to the details of the above-described exemplary example embodiments, but may be realized in other specific forms without departing from the spirit or essential characteristics of the present disclosure. Therefore, no matter from what point of view, the example embodiments should be considered exemplary and non-restrictive. The scope of the present disclosure is defined by the appended claims rather than by the foregoing description. Thus, all changes which are within the equivalent meanings and scope of the elements of the claims are covered by the present disclosure. The labels in the claims of the present disclosure shall not be constructed as limiting the claims. In addition, apparently the term "comprising" does not exclude other elements or steps, the singular does not exclude a plurality. A plurality of units or apparatuses described in the apparatus claim may be implemented by one unit or apparatus through software or hardware. The terms first, second, etc. are used to indicate the name, and do not indicate any particular sequence.

The invention claimed is:

1. A method comprising:
installing a new version of an application;
importing virtual machine status information of a currently running first process of the application into a second process of the application upon completion of the installation, the first process of the application running based on a previous version of the application and the second process of the application running based on the new version of the application;
starting the second process of the application;
establishing a connection between the second process of the application and a process of a machine emulator; and
exiting the first process of the application.

2. The method of claim 1, wherein:
the application is a program that manages a virtualization host; and
the machine emulator is a program that emulates a virtual machine.

3. The method of claim 1, further comprising:
prior to the importing the virtual machine status information of the currently running first process of the application into the second process of the application,
blocking a first event message sent by the process of the machine emulator to a process of the application, the process of the application including the first process of the application or the second process of the application, the first event message including an event message that the process of the machine emulator sends to the process of the application when a virtual machine status changes; and
after the exiting the first process of the application,
cancelling the blocking of the first event message.

4. The method of claim 3, wherein the blocking the first event message sent by the process of the machine emulator to the process of the application includes:
instructing the first process of the application to send a first command to the process of the machine emulator so that the process of the machine emulator pauses to send the first event message to the process of the application according to the first command.

5. The method of claim 3, wherein the cancelling the blocking of the first event message includes:
instructing the second process of the application to send a second command to the process of the machine emulator so that the machine emulator resumes to send the first event message to the process of the application according to the second command.

6. The method of claim 1, wherein the starting the second process of the application includes:
creating a connection path corresponding to the second process of the application to establish a connection between a client terminal and the second process of the application.

7. The method of claim 6, further comprising:
prior to the existing the first process of the application and after the starting the second process of the application,
selecting the connection path corresponding to the second process of the application according to a creation time of the connection path to establish the connection between the client terminal and the second process of the application.

8. The method of claim 1, further comprising:
prior to the starting the second process of the application,
obtaining virtual machine status information of a new virtual machine that is newly created by the first process of the application within a first time period, the first time period being a time period between a time that virtual machine status information of the first process of the application has been imported into the second process of the application and a time of starting the second process of the application; and
adding the virtual machine status information of the new virtual machine into virtual machine status information of the second process of the application.

9. The method of claim 8, wherein the obtaining the virtual machine status information of the new virtual machine includes:
prior to importing the virtual machine status information of the first process of the application into the second process of the application,
starting a monitor program to establishing a connection with the first process of the application;
instructing the monitor program to obtain a second event message sent by the first process of the application in the first time period, the second event message being directed to the virtual machine status information of the new virtual machine;
instructing the monitor program to establish a connection with the second process of the application and add the virtual machine status information of the new virtual machine into the second process of the application according to the second event message.

10. The method of claim 9, wherein the instructing the monitor program to establish the connection with the second process of the application and add the virtual machine status information of the new virtual machine into the second process of the application according to the second event message includes:
instructing the monitor program to establish the connection with the second process;
instructing the monitor program to copy a status file that stores the virtual machine status information of the new virtual machine into a virtual machine status file folder corresponding to the second process of the application; and
instructing the monitor program to call an importing interface of the second process of the application through the connection to import the virtual machine status information of the new virtual machine from the status file into the second process according to the second event message.

11. The method of claim 10, further comprising:
exiting the monitor program after the starting the second process of the application.

12. The method of claim 11, wherein:
the connection between the monitor program and the first process of the application is a read-only connection.

13. The method of claim 11, wherein the exiting the monitor program includes:
checking a connection in relation to the first process of the application, wherein the first process acts as a server terminal; and
exiting the monitor program in response to determining that only one client terminal in connection with the first process of the application and connection is a read-only connection.

14. The method of claim 1, wherein the exiting the first process of the application includes:
checking a connection in relation to the first process of the application, wherein the first process acts as a server terminal; and
exiting the first process of the application in response to determining that there exists no client terminal that establishes the connection with the first process of the application.

15. The method of claim 14, wherein the exiting the first process of the application in response to determining that there exists no client terminal that establishes the connection with the first process of the application includes:
in response to determining that there exists the connection between a client terminal and the first process and a preset condition is satisfied, instructing the first process of the application to re-check the connection to which the first process of the application acts as the server terminal until there exists no connection between the client terminal and the first process of the application; and exiting the first process of the application.

16. The method of claim 15, wherein the preset condition includes that there is a new client terminal that establishes or disconnects the connection with the first process of the application.

17. The method of claim 16, wherein the preset condition includes that a preset time period is passed.

18. A device comprising:
one or more processors; and
one or more memories storing thereon computer-readable instructions that, when executed by the one or more processors, cause the one or more processors to perform acts comprising:
installing a new version of an application;
importing virtual machine status information of a currently running first process of the application into a second process of the application upon completion of the installation, the first process of the application running based on a previous version of the application and the second process of the application running based on the new version of the application;
starting the second process of the application;
establishing a connection between the second process of the application and a process of a machine emulator; and
exiting the first process of the application.

19. The device of claim 18, wherein:
the application is a program that manages a virtualization host; and
the machine emulator is a program that emulates a virtual machine.

20. One or more memories storing thereon computer-readable instructions that, when executed by one or more processors, cause the one or more processors to perform acts comprising:
completing installing a new version of an application;
starting a monitor program to establishing a connection with a first process of the application, the first process of the application running based on a previous version of the application;
instructing the monitor program to obtain a second event message sent by the first process of the application in a first time period, the second event message being directed to virtual machine status information of new virtual machine that is newly created by the first process of the application in the first time period;
instructing the monitor program to establish a connection with a second process of the application and add the virtual machine status information of the new virtual machine into a second process of the application according to the second event message, the second process of the application running based on the new version of the application; and
starting the second process of the application.

* * * * *